US008705659B2

(12) United States Patent
Tong et al.

(10) Patent No.: US 8,705,659 B2
(45) Date of Patent: Apr. 22, 2014

(54) COMMUNICATION CHANNEL OPTIMIZATION SYSTEMS AND METHODS IN MULTI-USER COMMUNICATION SYSTEMS

(75) Inventors: Wen Tong, Ottawa (CA); Ming Jia, Ottawa (CA); Peiying Zhu, Kanata (CA); Alexandre M. Chloma, Moskovskaja Oblast (RU); Mikhail G. Bakouline, Moskovskaja Oblast (RU); Vitali B. Kreindeline, g. Moskva (RU)

(73) Assignee: Apple Inc., Cupertino, CA (US)

( * ) Notice: Subject to any disclaimer, the term of this patent is extended or adjusted under 35 U.S.C. 154(b) by 2485 days.

(21) Appl. No.: 10/792,127

(22) Filed: Mar. 4, 2004

(65) Prior Publication Data

US 2005/0101259 A1   May 12, 2005

Related U.S. Application Data

(60) Provisional application No. 60/517,389, filed on Nov. 6, 2003, provisional application No. 60/517,893, filed on Nov. 7, 2003.

(51) Int. Cl.
*H03C 7/00* (2006.01)
*H04L 27/00* (2006.01)

(52) U.S. Cl.
USPC .......................................... 375/315; 375/296

(58) Field of Classification Search
USPC .................. 375/315, 309, 295, 296
See application file for complete search history.

(56) References Cited

U.S. PATENT DOCUMENTS

| 5,828,658 A * | 10/1998 | Ottersten et al. ............... 370/310 |
| 6,873,606 B2 * | 3/2005 | Agrawal et al. ............... 370/310 |
| 2005/0053170 A1 * | 3/2005 | Catreux et al. ................ 375/267 |

FOREIGN PATENT DOCUMENTS

EP   1359683 A1 * 11/2003

OTHER PUBLICATIONS http://www.yourdictionare.com/subgroup; Screen capture of the defintion of this term was made Nov. 18, 2010.*
http://www.yourdictionare.com/subset; Screen capture of the defintion of this term was made Nov. 18, 2010.*
Love, David J. et al.; Limited Feedback Precoding for Spatial Multiplexing Systems Using Linear Receivers; 2003 Military Communications Conference; Milcom 2003, Boston, MA, Oct. 13-16, 2003. pp. 627-632.
Windpassinger, C.; Precoding and Loading for Blast-Like Systems; 2003 IEEE International Conference on Communications, Anchorage, AK, May 11-15, 2003, pp. 3061-3065.
Lebrun, G. et al; MIMO Transmission Over a Time-Varying Channel Using SVD; GLOBECOM'02, 2002—IEEE Global Telecommunications Conference, Conference Proceedings, Taipei, Taiwan, Nov. 17-21, 2002; pp. 414-418.

(Continued)

*Primary Examiner* — Kevin M Burd
(74) *Attorney, Agent, or Firm* — Womble Carlyle Sandridge & Rice LLP

(57) ABSTRACT

Systems and methods of optimizing communication channels in multi-user communication systems are provided. Coding weights are determined based on communication channel state information for communication channels between a transmitter and multiple receivers. The coding weights are applied to communication signals to be transmitted from the transmitter to the receivers. Each receiver decodes received signals using inverses of the coding weights. Embodiments of the invention support multi-user MIMO (Multiple Input Multiple Output) where each receiver has fewer antennas than the transmitter, and enhance system performance if the total number of antennas at all of the receivers exceeds the number of antennas at the transmitter.

8 Claims, 12 Drawing Sheets

(56) References Cited

OTHER PUBLICATIONS

Sampath, H. et al.; Joint Transmit and Receive Optimization for High Data Rate Wireless Communication Using Multiple Antennas; Signals, Systems, and Computers, 1999, Conference Record of the Thirty-Third Asilomar Conference on Oct. 24-27, 1999, Piscataway, NJ, IEEE, pp. 215-219.

Flikkema, Paul G.; Space-Time Zero-Forcing Pre-Equalization for Synchronous Dispersive Multi-User Channels; $5^{th}$ International Symposium on Wireless Personal Multimedia Communications Proceedings; vol. 3, Oct. 27, 2002, pp. 1333-1336.

Sampath, Hemanth; Linear Precoding and Decoding for Multiple Input Multiple Output (MIMO) Wireless Channels; Apr. 2001; pp. 1-177.

* cited by examiner

COMMUNICATION CHANNEL OPTIMIZATION SYSTEMS AND METHODS IN MULTI-USER COMMUNICATION SYSTEMS

CROSS-REFERENCE TO RELATED APPLICATIONS

This application claims priority from U.S. provisional patent application Ser. No. 60/517,389, filed on Nov. 6, 2003, and provisional patent application Ser. No. 60/517,893, filed on Nov. 7, 2003. The entire contents of each of these provisional applications are hereby incorporated herein by reference.

FIELD OF THE INVENTION

The invention relates to communication systems in general, and particularly to communication channel optimization in multi-user communication systems.

BACKGROUND

In any communication system, the quality and capacity of a communication channel are affected by such factors as interference, allocation of communication resources, the communication schemes or algorithms used on the communication channel, and the particular communication equipment implemented at transmitting and receiving ends of the channel.

The effects of certain factors may be mitigated through efficient resource allocation and selection of communication schemes and equipment. According to some conventional communication techniques, processing operations intended to compensate for other communication channel effects are primarily receiver based. For example, interference cancellation is performed by a receiver in known communication systems. In addition, the implementation of different types of communication equipment in conjunction with the same type of channel, such as different communication terminals in a wireless communication system for instance, may affect received signal processing operations at all receivers.

Communication terminals at the ends of a communication channel are seldom identical. In wireless communication systems, for example, user communication terminals at one end of a communication channel normally have much more limited resources than base stations. In known MIMO (Multiple Input Multiple Output) systems, each receiver has at least as many antennas as a transmitter. This constraint is difficult to satisfy where communication equipment on opposite ends of a communication channel are significantly different, as in the case of wireless communication terminals and base stations in wireless communication systems, for example. In addition, resource limitations at one receiver in such a multi-user system can also affect other receivers in the system.

SUMMARY OF THE INVENTION

According to one aspect of the invention, a method of processing signals to be transmitted to receivers on communication channels is provided. The method includes determining pre-coding signal weights based on channel state information associated with the communication channels to provide proportional power allocation to the signals, and applying the signal weights to the signals. In a preferred embodiment, the channel state information is received from the receivers.

The invention also provides, in another aspect, a method which includes receiving over a sub-group of communication channels a subset of signals to which pre-coding signal weights based on channel state information associated with the communication channels to provide proportional power allocation have been applied. The received subset of signals using inverses of the pre-coding signal weights based on channel state information associated with the sub-group of channels to decode the received subset of signals.

According to an embodiment of the invention, the signals to be transmitted include respective groups of signals to be transmitted to the receivers, and the pre-coding weights are determined to separate the respective groups of signals. Decoding then separates individual signals in the received subset of signals.

In another aspect, the invention provides a system for processing signals to be transmitted to receivers on communication channels. The system preferably includes an input for receiving the signals and a processor. The processor is configured to determine pre-coding signal weights based on channel state information associated with the communication channels to provide proportional power allocation to the signals, and to apply the signal weights to the signals. In a preferred embodiment, the system further includes multiple antennas which provide respective sub-MIMO channels to the receivers.

The invention also provides a system that includes an input an input for receiving over a sub-group of communication channels a subset of signals to which pre-coding signal weights based on channel state information associated with the communication channels to provide proportional power allocation have been applied, and a processor. The processor is configured to decode the received subset of signals using inverses of the pre-coding signal weights based on channel state information associated with the sub-group of the channels.

A further method of processing signals to be concurrently transmitted to receivers over communication channels, in accordance with still another aspect of the invention, includes determining channel state information for the communication channels, determining a spatial coding matrix which includes respective set of spatial coding weights for each of the receivers based on the channel state information, and applying the spatial coding weights in the spatial coding matrix to the signals.

A method in accordance with a still further aspect of the invention includes determining channel state information for a communication channel between a receiver and a transmitter, transmitting the channel state information to the transmitter, and receiving from the transmitter one of a plurality of demodulation matrices for demodulating subsequently received communication signals to which spatial coding weights comprising respective sets of spatial coding weights for multiple receivers have been applied.

A network element for processing signals to be concurrently transmitted to multiple communication terminals in a communication network is also provided. The network element preferably includes an input configured to receive the signals, and a processor. The processor is configured to determine channel state information for each communication channel between the network element and the communication terminals, to determine a spatial coding matrix comprising a respective set of spatial coding weights for each of the communication terminals based on the channel state information, and to apply the spatial coding weights in the spatial coding matrix to the signals.

In a related aspect, a communication terminal for operation in a communication network is provided. A processor in the terminal is configured to determine channel state information for communication channels between the communication terminal and a network element in the communication network. The terminal also includes at least one antenna for transmitting the channel state information from the communication terminal to the network element, receiving a demodulation matrix from the network element, and receiving signals concurrently transmitted to multiple communication terminals from the network element. The processor is further configured to demodulate the received signals using the demodulation matrix.

Other aspects and features of the present invention will become apparent to those ordinarily skilled in the art upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

According to embodiments of the present invention, systems and methods are provided which enhance the performance of communication channels in a communication system, to thereby improve, for example, the transmission performance of multi-user MIMO (Multiple Input Multiple Output) communication systems.

In MIMO systems, a multi-data stream transmitter at a base transceiver station (BTS) that provides communication services for a coverage area or cell in a wireless communication system transmits communication signals to user terminals via multiple antennas. User terminals are also commonly referred to as user equipment (UE), communication devices, and mobile stations, for instance. At a UE side, multiple receive antennas are employed for each user.

Figure 1:
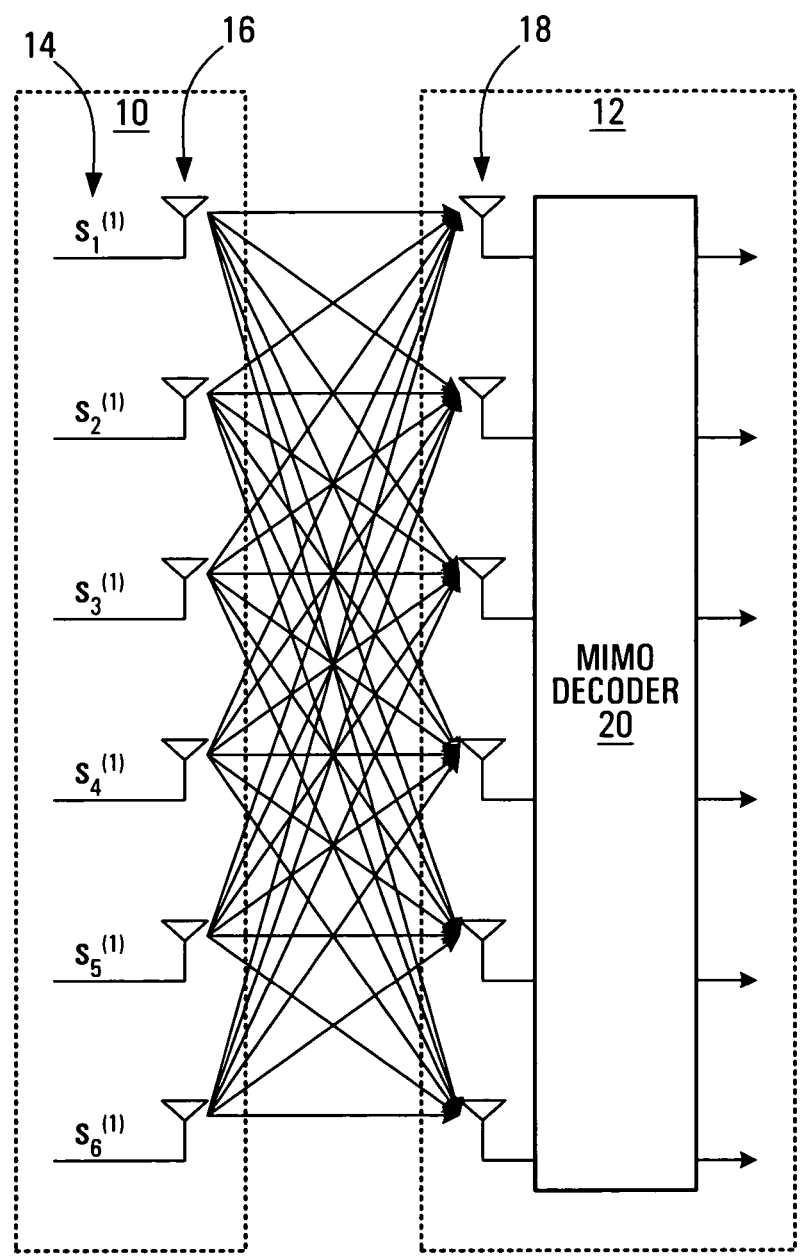
FIG. 1 is a block diagram of a 6×6 MIMO system.

FIG. 1 is a block diagram of a 6×6 MIMO system, which includes a plurality of antennas 16 at a BTS 10, and a plurality of antennas 18 and a MIMO decoder 20 at a UE 12. In this system, 6 communication signals 14 intended for the UE 20, labelled as $s_1^{(1)}$ through $s_6^{(1)}$ are transmitted via the antennas 16 from the BTS 10 to the UE 12. At the UE 12, each of the antennas 18 receives the signals transmitted from the antennas 16, and the received signals are decoded in a MIMO decoder 20.

It should be appreciated that the system of FIG. 1 is intended for illustrative purposes only. As will be apparent to those skilled in the art to which the present invention pertains, BTSs include further components in addition to the antennas 16, such as components to generate the signals $s_1^{(1)}$ through $S_6^{(1)}$ for instance. Similarly, the UE 12 includes components to further process received signals decoded by the MIMO decoder 20. Also, the BTS 10 and the UE 12 normally support both transmit and receive operations.

Known MIMO systems do not support simultaneous multi-user MIMO transmissions where each UE does not have at least the same number of antennas as a BTS. Instead, MIMO is typically used as a single "fat-pipe", and multiple users are served through the use of time division techniques. In addition, it is practically difficult to realize very large dimension MIMO systems, 8×8 systems for example, due the physical size limitations of UEs. As the physical size of a UE is usually limited, the distance by which multiple antennas for larger dimension MIMO systems can be separated is also limited, such that the antennas at the UE become highly correlated. This drastically reduces the MIMO channel capacity.

Figure 2:
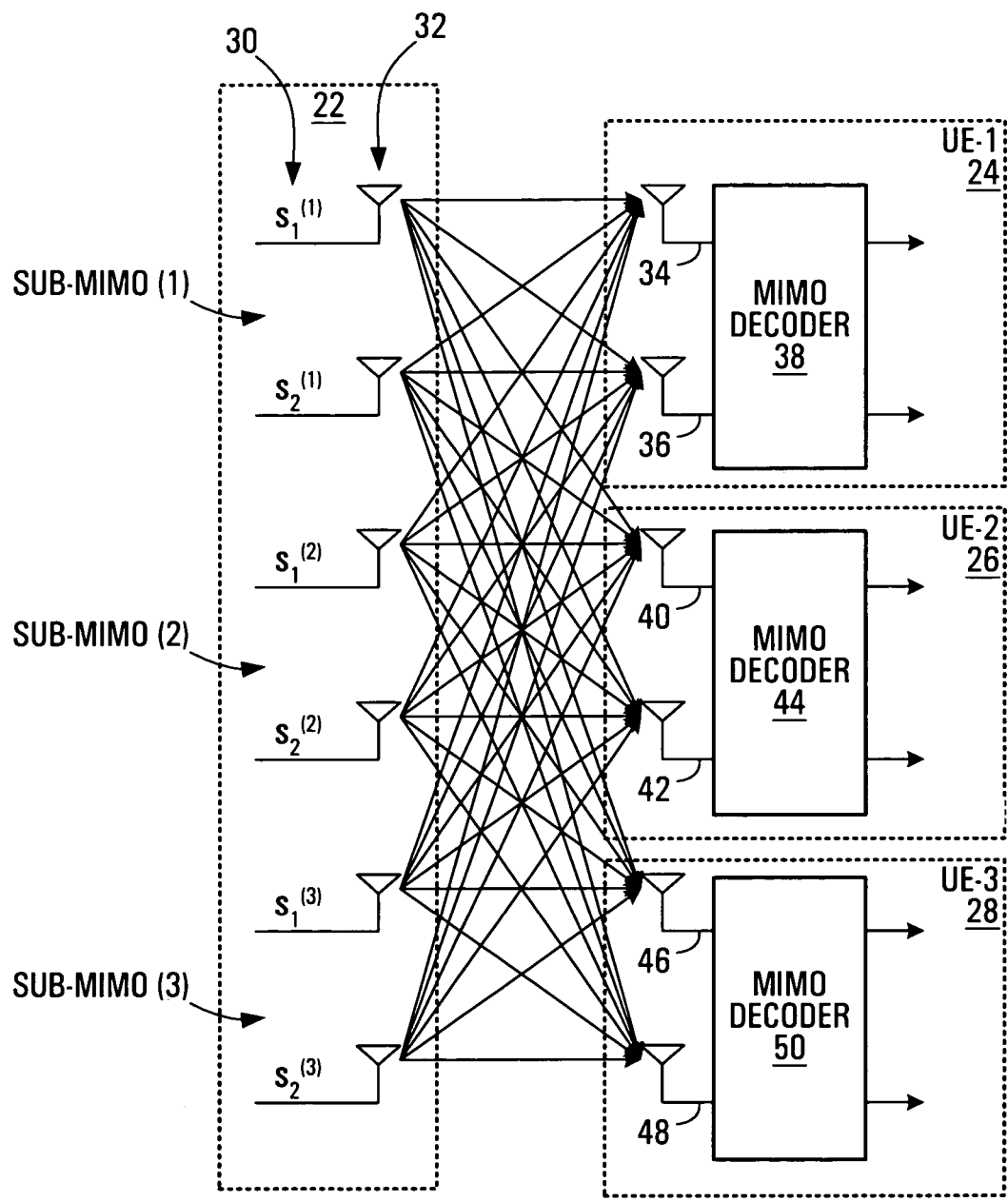
FIG. 2 is a block diagram of a decomposed 6×6 MIMO system.

However, large dimension MIMO systems may be decomposed into combined sub-MIMO systems, because in general, channel fading between different UEs is un-correlated. MIMO channel capacity can then be more efficiently exploited. FIG. 2 is a block diagram of a decomposed 6×6 MIMO system. The decomposed 6×6 MIMO system includes antennas 32 at a BTS 22, and three UEs 24, 26, 28, each of which includes a pair of antennas 34/36, 40/42, 46/48 and a MIMO decoder 38, 44, 50. At the BTS 22, signals $s_1^{(1)}/s_2^{(1)}$, $s_1^{(2)}/s_2^{(2)}$, $s_1^{(3)}/s_2^{(3)}$ are transmitted via a respective antenna in each of a plurality of sub-groups, pairs in FIG. 2, of the antennas 32 to corresponding UEs 24, 26, 28. The superscripts (1), (2), (3) indicate for which UE 24, 26, 28, a signal is intended. Each pair of the antennas 32 forms a 2×2 sub-MIMO channel with the pair of antennas of a respective one of the UEs 24, 26, 28.

To apply the MIMO technique to a multi-user system, inter-user MIMO interference is a major issue. In FIG. 2, for example, although each pair of signals $s_1^{(1)}/s_2^{(1)}$, $s_1^{(2)}/s_2^{(2)}$, $s_1^{(3)}/s_2^{(3)}$ may be intended for a particular UE 24, 26, 28, the antennas 34/36, 40/42, 46/48 in each of the UEs 24, 26, 28 receive communication signals from all of the antennas 32. In order to cancel such interference using known techniques, the number of receive antennas must be equal to or greater than the number of transmit antennas. Due primarily to physical space and form factor constraints on UEs, the number of antennas that can be provided at a UE is limited. Thus, for downlink (BTS to UE) transmissions, the number of receive antennas is typically smaller than the number of transmit antennas.

Figure 3:
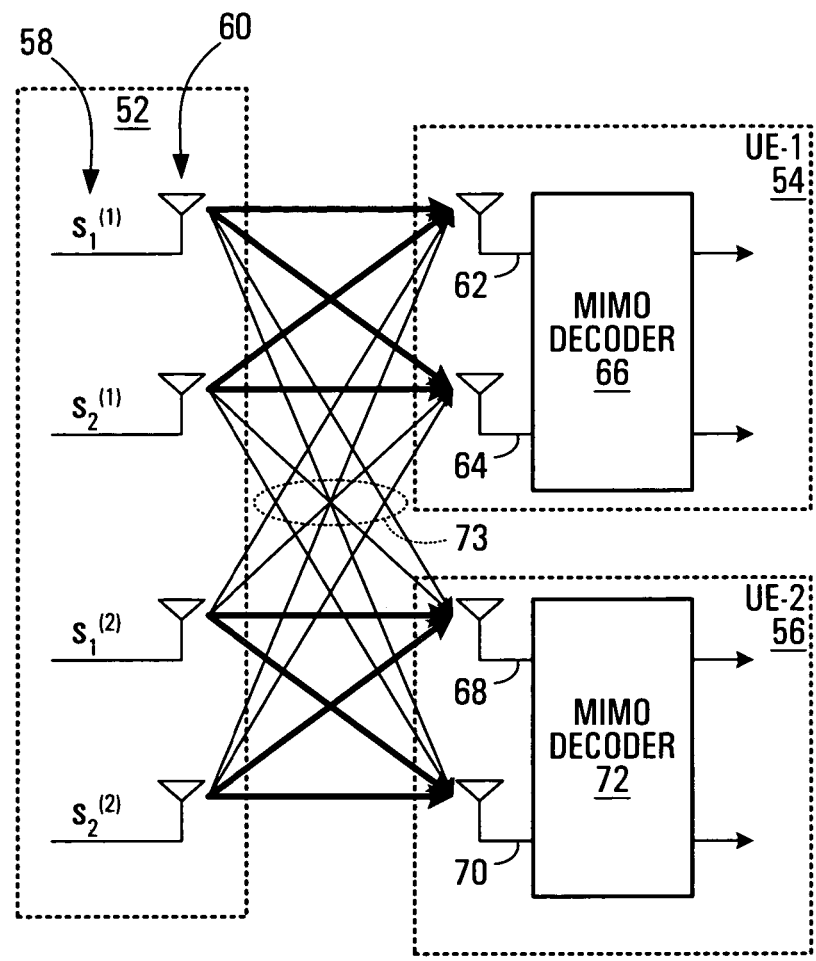
FIG. 3 is a block diagram of a MIMO system, illustrating inter-user interference.
Figure 4:
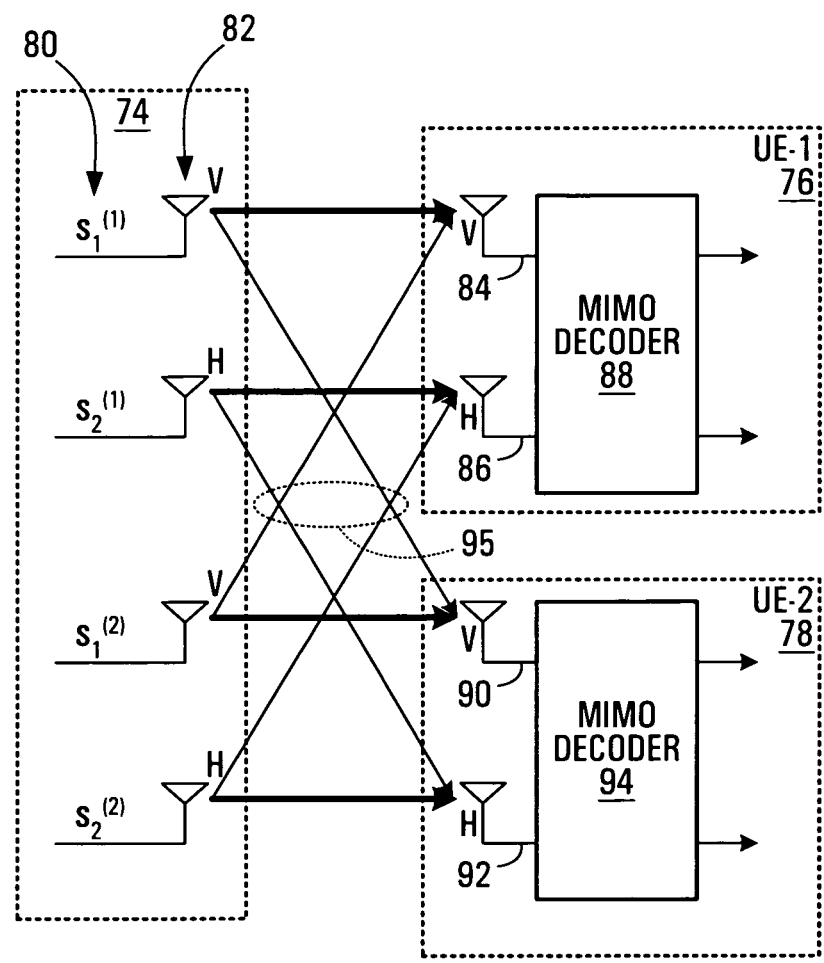
FIG. 4 is a block diagram of a MIMO system using polarized communication channels, illustrating inter-user interference.

FIGS. 3 and 4 are block diagrams of MIMO systems, and illustrate inter-user interference. In the system of FIG. 3, the signals 58, labelled $s_1^{(1)}/s_2^{(1)}$, $s_1^{(2)}/s_2^{(2)}$, are transmitted from the BTS 52 via respective ones of each pair of the antennas 60 to the UEs 54, 56. Signals received by the antennas 62/64, 68/70 in the UEs 54, 56 are processed by the MIMO decoders 66, 72. Interference in the MIMO system of FIG. 3 is indicated at 73. As shown, any communication signals that are received at one of the UEs 54, 56 but intended for the other of the UEs 54, 56 represent interference at that UE. For example, versions of $s_1^{(2)}$ and $s_2^{(2)}$ received at the UE 54 represent interference.

Similarly, in FIG. 4, the signals 80, labelled $s_1^{(1)}/s_2^{(1)}$, $s_1^{(2)}/s_2^{(2)}$, are transmitted from the BTS 74 via respective ones of each pair of the antennas 82 to the UEs 76, 78, received by the antennas 84/86, 90/92, and processed by the MIMO decoders 88, 94. Polarized channels, provided by the vertical- and horizontal-polarization antennas V and H in the example system of FIG. 4, reduce interference 95 relative to the general MIMO system of FIG. 3, but do not cancel the inter-user interference to such a degree that interference cancellation is unnecessary.

The task of interference cancellation is typically performed at a user terminal. In accordance with an embodiment of the invention, downlink communication channel interference cancellation is effectively split between the BTS (transmit) side and the UE (receive) side. For example, a BTS may perform inter-user separation based pre-coding of data to be transmitted, while at the UE side, a UE performs MIMO layer separation and decoding.

One type of multi-user MIMO system in which the invention may be implemented delivers communication signals according to the layered space-time known as MIMO-BLAST concurrently to multiple users. Such a system is preferably realized with feedback of communication channel state information from each UE to a BTS. Channel state feedback techniques are very well suited for application in conjunction with fixed or nomadic wireless communication channels due to the slow variation of such channels, which allows accurate channel state information feedback from the UEs to the BTS.

In one embodiment, a closed-loop pre-coded transmit antenna array for sub-MIMO transmission, preferably MIMO-BLAST transmission, in a multi-user environment is provided. Channel state information is measured by or fed back to a BTS, and at the BTS side, jointly optimized weights are computed and applied to antenna input signals to cancel inter-user MIMO interference. Therefore, in one sense, a system in accordance with this embodiment of the invention may be considered as an adaptive weighted transmit antenna array operating in the MIMO-BLAST mode. This concept is a departure from the conventional beamforming phased antenna array.

A MIMO system can be expressed as $$\bar{y} = H\bar{s} + \bar{\eta}, \quad (1)$$

where
$\bar{y} = [y_1 \; y_2 \; \ldots \; y_N]^T$ is a vector of communication signals received at a receiver;
$\bar{s} = [s_1 \; s_2 \; \ldots \; s_M]^T$ is a vector of communication signals transmitted by a transmitter;
$\bar{\eta} = [\eta_1 \; \eta_2 \; \ldots \; \eta_N]^T$ is a vector of noise components affecting the transmitted communication signals;

$$H = \begin{bmatrix} h_{11} & h_{12} & \ldots & h_{1M} \\ h_{21} & h_{22} & \ldots & h_{2M} \\ \vdots & \vdots & \ddots & \vdots \\ h_{N1} & h_{N2} & \ldots & h_{NM} \end{bmatrix}$$

is a channel matrix of communication channel attenuation factors;
N is a number of antennas at the receiver; and
M is a number of antennas at the transmitter.

To decode the transmitted signal $\bar{s}$, the receiver performs the inverse process $$\bar{s} = G\bar{y} - G\bar{\eta}, \quad (2)$$

where $$G = H^+ = (H'H)^{-1}H' \quad (3)$$

is the Moore-Penrose pseudo-inverse of H, and H' is a conjugate matrix of H, illustratively a Hermitian conjugation or conjugate transpose. The post-detection SNR (signal-to-noise ratio) for a decoded element $s_i$ of $\bar{s}$ is given by $$\gamma_i = \frac{|s_i|^2}{\sigma^2 \|\bar{g}_i\|^2}, \quad (4)$$

where $\bar{g}_i$ is the ith row of G, and $\sigma^2$ represents the variance of the elements in $\bar{\eta}$ (assuming that all the elements in $\bar{\eta}$ have the same level of variance). From equation (4), it can be seen that the SNR of post-detection signals is determined by G, which is given by equation (3). Note that $\|\bar{g}_i\|^2$ is not only determined by channel attenuation factors $|h_{ij}|$, but by the condition of the channel matrix H as well. When H is ill-conditioned, $\|\bar{g}_i\|^2$ can be very large; hence $\gamma_i$ will be very small.

From equation (2), it can be seen that the post-detection signal power is a fixed value $|s_i|^2$, such that $\gamma_i$ is in fact determined by the second term $G\bar{\eta}$ only. System performance can be improved by reducing post-detection noise, which is represented by $\|\bar{g}_i\|^2$. One possible issue to consider in this regard is whether, when a transmitter has information about H, pre-equalization can improve system performance.

By defining a new signal vector, illustratively for the square channel matrix case in which M=N, $$\bar{x} = J\bar{s} = H'(HH')^{-1}\bar{s}, \quad (5)$$

we have $$\bar{r} = H\bar{x} = \bar{s}. \quad (6)$$

The matrices G and J are equal in this example, when H is a square matrix (M=N).

The SNR for this pre-equalized signal can be expressed as $$\kappa_i = \frac{|s_i|^2}{\|\bar{j}_i\|^2 \sigma^2}, \quad (7)$$

where $\bar{j}_i$ is the ith row of J.

The pre-equalization approach is similar to power control, i.e., the weak user gets more power so that all the users are equal. However, this is not an efficient approach to utilize system power.

Another important observation is that the pre-equalization matrix J is completely determined by the channel matrix H. That is, except for making up an identity matrix, there are no other kinds of optimizations in J.

An embodiment of the invention provides for user separation at the transmitter. One preferred user separation technique allows the use of ML (Maximum Likelihood) detection schemes at a receiver, such that the diversity order for each receiver is increased. In addition, since layers need not be separated within a BTS, system performance may be improved in at least two further aspects, namely, to enhance an equivalent channel matrix and proportional transmitting power allocation.

Figure 5:
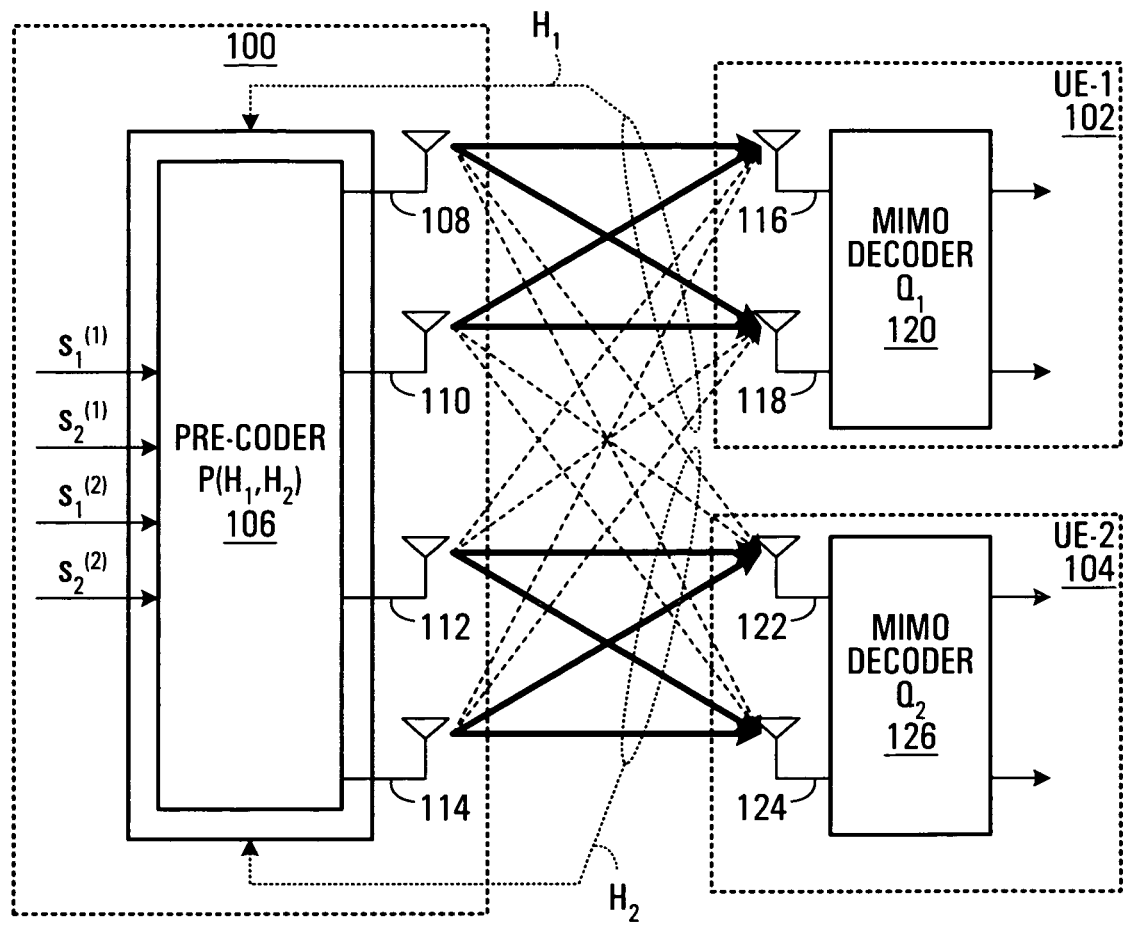
FIG. 5 shows a block diagram of a MIMO system according to an embodiment of the invention.

FIG. 5 shows a block diagram of a MIMO system according to an embodiment of the invention. The system includes a BTS 100 having a pre-coder 106 and a plurality of antennas 108, 110, 112, 114, and UEs 102, 104, each having a plurality of antennas 116/118, 122/124 and a MIMO decoder 120, 126. In FIG. 5, M=4, $N_i$=2 is the number of antennas at an ith UE, U=2 is the number of UEs, and M=U*$N_i$. In a particularly preferred embodiment, the system of FIG. 5 is a MIMO BLAST system.

Of course, the system of FIG. 5 is one illustrative example of a system in which the invention may be implemented. The invention is in no way limited thereto. Extension of the principles of the present invention to systems having other dimensions will be apparent to those skilled in the art.

At the BTS side, the BTS 100 preferably uses the U degrees of freedom (one per UE 102, 104) of the transmit antennas 108, 110, 112, 114 to perform weighted pre-coding of the signals $s_1^{(1)}$, $s_2^{(1)}$, $s_1^{(2)}$, $s_2^{(2)}$ in the pre-coder 106, while reserving the $N_i$ degrees of freedom (one per receive antenna of each UE 102, 104) of the transmit antennas 108, 110, 112, 114 to maximize the $N_i \times N_i$ sub-MIMO channel capacity and proportional antenna power allocation for each user.

At the UE side, each UE 102, 104 decodes communication signals received at its antennas 116/118, 122/124, using ML or MMSE (Minimum Mean Squared Error) decoding, for example. The $N_i$ antennas also provide diversity gain.

The UE-1 102 preferably determines and feeds back channel state information $H_1$ (4×2) to the BTS 100. The UE-2 104 similarly preferably determines and feeds back channel state information $H_2$ (4×2) to the BTS 100. For some types of communication channel, channel state information may instead be determined locally by the BTS 100. Thus, channel state information determination is shown conceptually in FIG. 5 outside the UEs 102, 104. Those skilled in the art will appreciate that channel state determination may be performed in the UEs 102, 104 or the BTS 100 by a digital signal processor (DSP) or a general-purpose processor adapted to execute signal processing software, for example. Various techniques for determining channel state information will be apparent to those skilled in the art, including estimation based on pilot channels in CDMA (Code Division Multiple Access) systems or preambles and scattered pilot tones in OFDM (Orthogonal Frequency Division Multiplexing) systems, for example.

Based on the channel state information $H_1$ and $H_2$, the BTS 100 computes an antenna weight matrix or pre-coding matrix P, which preferably cancels inter-user MIMO interference between UE-1 102 and UE-2 104 and maximizes MIMO system channel capacity for UE-1 102 and UE-2 104.

Before proceeding with a detailed analysis of the system of FIG. 5, a combined (with respect to users) 2×2 MIMO system, in which M=2, $N_i$=1, and U=2, is first considered. In this system, there are no multiple layers associated with each user. The channel matrix H can be expressed as $$H = \begin{bmatrix} h_{11} & h_{12} \\ h_{21} & h_{22} \end{bmatrix}. \tag{8}$$

Now we define a pre-coding matrix P, so that $$C = HP = \begin{bmatrix} h_{11} & h_{12} \\ h_{21} & h_{22} \end{bmatrix}\begin{bmatrix} p_{11} & p_{12} \\ p_{21} & p_{22} \end{bmatrix} \tag{9}$$

-continued
$$= \begin{bmatrix} h_{11}p_{11} + h_{12}p_{21} & h_{11}p_{12} + h_{12}p_{22} \\ h_{21}p_{11} + h_{22}p_{21} & h_{21}p_{12} + h_{22}p_{22} \end{bmatrix}.$$

One goal is to identify if a solution to the following equation exists:

$$\begin{cases} \max_{p_{11},p_{21}} |h_{11}p_{11} + h_{12}p_{21}| \\ h_{21}p_{11} + h_{22}p_{21} = 0 \end{cases} \tag{10}$$

$$\begin{cases} \max_{p_{12},p_{22}} |h_{21}p_{12} + h_{22}p_{22}| \\ h_{11}p_{12} + h_{12}p_{22} = 0 \end{cases}.$$

In the pre-equalization approach, the set of elements in a pre-equalization matrix $\{j_{11}, j_{21}, j_{12}, j_{22}\}$ are used to satisfy the following condition:

$$\begin{cases} h_{11}j_{11} + h_{12}j_{21} = 1 \\ h_{21}j_{11} + h_{22}j_{21} = 0 \end{cases} \tag{11}$$

$$\begin{cases} h_{21}j_{12} + h_{22}j_{22} = 1 \\ h_{11}j_{12} + h_{12}j_{22} = 0 \end{cases}.$$

Given the same $\|\bar{p}_i\|^2 = \|\bar{j}_i\|^2$, with i=1,2, equation (11) forces $h_{11}j_{11}+h_{12}j_{21}$ and $h_{21}j_{12}+h_{22}j_{22}$ to 1, while equation (10) tries to maximize the power of the analogous components $h_{11}p_{11}+h_{12}p_{21}$ and $h_{21}p_{12}+h_{22}p_{22}$. This illustrates one primary difference between the user separation techniques according to embodiments of the invention and pre-equalization approaches.

Equation (10) can be manipulated to the form of $$\begin{cases} \max_{p_{11}} \left| p_{11}\left(h_{11} - \frac{h_{12}h_{21}}{h_{22}}\right) \right| \\ p_{21} = -\frac{h_{21}h_{11}}{h_{22}} \end{cases} \tag{12}$$

$$\begin{cases} \max_{p_{22}} \left| p_{22}\left(h_{22} - \frac{h_{21}h_{12}}{h_{11}}\right) \right| \\ p_{12} = -\frac{h_{12}h_{22}}{h_{11}} \end{cases}.$$

Although there is no optimized solution to equation (12), selection of $p_{11}$ and $p_{22}$ such that $$|p_{11}| \propto \left| h_{11} - \frac{h_{12}h_{21}}{h_{22}} \right| \text{ and } |p_{22}| \propto \left| h_{22} - \frac{h_{12}h_{21}}{h_{11}} \right| \tag{13}$$

improves the system capacity.

If each UE has only one receive antenna and receives only one layer of the MIMO signal, then proportional power allocation may be achieved. However, if a UE has multiple antennas and receives multiple layers of signals, as in FIG. 5, then the situation will be different.

As described briefly above, the pre-coder 106 at the BTS 100 determines and applies pre-coding weights to the signals $s_1^{(1)}$, $s_2^{(1)}$, $s_1^{(2)}$, $s_2^{(2)}$ to perform the function of inter-user interference cancellation through user separation. Each receiver, UEs 102, 104 in FIG. 5, then performs the function of inter-antenna interference cancellation. Thus, algorithms such as ML and iterative ZF (Zero Forcing)/MMSE can be used to further improve detection results. The concept of splitting interference cancellation functions between the transmitter and receivers is described in further detail below.

For the combined 2×2 MIMO multi-user system of FIG. 5, the pre-coding matrix P is selected so that the combined channel matrix C has the format of $$C = HP = \begin{bmatrix} c_{11} & c_{12} & 0 & 0 \\ c_{21} & c_{22} & 0 & 0 \\ 0 & 0 & c_{33} & c_{34} \\ 0 & 0 & c_{43} & c_{44} \end{bmatrix}. \quad (14)$$

Note that only $\bar{c}_1$ and $\bar{c}_2$, where $\bar{c}_i$ represents the i-th row of C, affect the UE-1 102, and that only $\bar{c}_3$ and $\bar{c}_4$ affect the UE-2 104. The combined channel matrix C has a form of U $N_i \times N_i$ sub-matrices, diagonal elements of which are respective diagonal elements of C. Elements of C outside the plurality of $N_i \times N_i$ sub-matrices are zero. In another sense, C may be considered as having groups of rows associated with UEs and groups of columns respectively associated with antenna pairs. For example, $\bar{c}_1$ and $\bar{c}_2$ are associated with the UE-1 102 as described above, and the columns of C are respectively associated with the antennas 108, 110, 112, 114. As the antenna pairs 108/110 and 112/114 provide sub-MIMO channels to the UEs 102 and 104, each pair may be considered to be associated with a respective one of the UEs 102 and 104. Thus, each element of C positioned in a row associated with a particular UE and a column corresponding to an antenna that is associated with a different UE is forced to zero by selection of pre-coding weights in the pre-coding matrix P.

The first two columns of the pre-coding matrix P are determined such that they satisfy $$\begin{cases} c_{11} = h_{11}p_{11} + h_{12}p_{21} + h_{13}p_{31} + h_{14}p_{41} \\ c_{21} = h_{21}p_{11} + h_{22}p_{21} + h_{23}p_{31} + h_{24}p_{41} \\ h_{31}p_{11} + h_{32}p_{21} + h_{33}p_{31} + h_{34}p_{41} = 0 \\ h_{41}p_{11} + h_{42}p_{21} + h_{43}p_{31} + h_{44}p_{41} = 0 \end{cases}, \text{and} \quad (15)$$

$$\begin{cases} c_{12} = h_{11}p_{12} + h_{12}p_{22} + h_{13}p_{32} + h_{14}p_{42} \\ c_{22} = h_{21}p_{12} + h_{22}p_{22} + h_{23}p_{32} + h_{24}p_{42} \\ h_{31}p_{12} + h_{32}p_{22} + h_{33}p_{32} + h_{34}p_{42} = 0 \\ h_{41}p_{12} + h_{42}p_{22} + h_{43}p_{32} + h_{44}p_{42} = 0 \end{cases}. \quad (16)$$

The second two columns of P, related to the UE-2 104, are preferably determined in an analogous manner.

From equation (14), it is not difficult to see that the equivalent system for UE-1 102 is $$\begin{bmatrix} y_1 \\ y_2 \end{bmatrix} = \begin{bmatrix} c_{11} & c_{12} \\ c_{21} & c_{22} \end{bmatrix} \begin{bmatrix} s_1 \\ s_2 \end{bmatrix}, \quad (17)$$

which represents a 2×2 MIMO system. When an ML decoder is used at a UE, the diversity order is two.

The decoders 120, 126 decode received signals using an inverse matrix such as the Moore-Penrose pseudo-inverse matrix of a corresponding sub-matrix of P. In FIG. 5, $Q_1$ and $Q_2$ indicate sub-matrices of such an inverse matrix Q that relate to the UEs 102, 104, respectively. Preferably, an inverse matrix D of C=HP, or strictly sub-matrices $D_1$ and $D_2$ thereof, are used by the decoders 120, 126 in FIG. 5. These matrices can be derived by each receiver based on channel estimation using pilot channels, for example. In one embodiment, the BTS 100 sends pilot tones to UEs 102, 104, and each UE the estimates the elements of its corresponding inverse sub-matrix.

For brevity, the following analysis relates only to the UE-1 102. Those skilled in the art will appreciate that the analysis for the UE-2 104 would be similar.

In equation (15), let $p_{31}$ and $p_{41}$ force $c_{13}=c_{14}=0$, which gives $$\begin{bmatrix} p_{31} \\ p_{41} \end{bmatrix} = -\frac{1}{\Delta} \begin{bmatrix} h_{44} & -h_{34} \\ -h_{43} & h_{33} \end{bmatrix} \begin{bmatrix} h_{31} & h_{32} \\ h_{41} & h_{42} \end{bmatrix} \begin{bmatrix} p_{11} \\ p_{21} \end{bmatrix}, \quad (18)$$

where $\Delta = h_{33}h_{44} - h_{34}h_{43}$.

If A is defined as $$A = \begin{bmatrix} h_{11} & h_{12} \\ h_{21} & h_{22} \end{bmatrix} - \frac{1}{\Delta} \begin{bmatrix} h_{13} & h_{14} \\ h_{23} & h_{24} \end{bmatrix} \begin{bmatrix} h_{44} & -h_{34} \\ -h_{43} & h_{33} \end{bmatrix} \begin{bmatrix} h_{31} & h_{32} \\ h_{41} & h_{42} \end{bmatrix}, \text{then} \quad (19)$$

$$\begin{bmatrix} c_{11} \\ c_{21} \end{bmatrix} = A \begin{bmatrix} p_{11} \\ p_{21} \end{bmatrix}. \quad (20)$$

As the matrix A is determined by the channel matrix H, $p_{11}$ and $p_{12}$ are free to be chosen, and as such can be used for channel matrix optimization.

Similarly, from equation (16), $$\begin{bmatrix} p_{32} \\ p_{42} \end{bmatrix} = -\frac{1}{\Delta} \begin{bmatrix} h_{44} & -h_{34} \\ -h_{43} & h_{33} \end{bmatrix} \begin{bmatrix} h_{31} & h_{32} \\ h_{41} & h_{42} \end{bmatrix} \begin{bmatrix} p_{12} \\ p_{22} \end{bmatrix}, \text{and} \quad (21)$$

$$\begin{bmatrix} c_{12} \\ c_{22} \end{bmatrix} = A \begin{bmatrix} p_{12} \\ p_{22} \end{bmatrix}. \quad (22)$$

By combining equations (20) and (22), we can establish a relation between $$\begin{bmatrix} c_{11} & c_{12} \\ c_{21} & c_{22} \end{bmatrix} \text{ and } \begin{bmatrix} p_{11} & p_{12} \\ p_{21} & p_{22} \end{bmatrix}$$

as follows:

$$\begin{bmatrix} c_{11} & c_{12} \\ c_{21} & c_{22} \end{bmatrix} = A \begin{bmatrix} p_{11} & p_{12} \\ p_{21} & p_{22} \end{bmatrix}, \quad (23)$$

and the parameters in $$\begin{bmatrix} p_{11} & p_{12} \\ p_{21} & p_{22} \end{bmatrix}$$

provide for optimization of the channel matrix $$\begin{bmatrix} c_{11} & c_{12} \\ c_{21} & c_{22} \end{bmatrix}.$$

Note that in the pre-equalization case, $$\begin{bmatrix} p_{11} & p_{12} \\ p_{21} & p_{22} \end{bmatrix}$$

is selected in such a way that $$\begin{bmatrix} c_{11} & c_{12} \\ c_{21} & c_{22} \end{bmatrix}$$

is set to $$\begin{bmatrix} 1 & 0 \\ 0 & 1 \end{bmatrix}.$$

On the contrary, in this procedure, two goals are achieved during pre-coding, namely, separating the layers with respect to receivers and allocating transmitting power to facilitate equal layer performance. Since individual layers now no longer need to be separated at a transmitter, and power allocation is not pre-equalization, the matrix $$\begin{bmatrix} p_{11} & p_{12} \\ p_{21} & p_{22} \end{bmatrix}$$

may be chosen according to different criteria, such as improving channel matrix condition and providing proportional power allocation, for example.

To improve channel matrix condition, $$\left| \det\left( \begin{bmatrix} c_{11} & c_{12} \\ c_{21} & c_{22} \end{bmatrix} \right) \right|$$

should be maximized. One possible way to achieve this is to force the elements in A to add constructively to form the diagonal elements $c_{11}$ and $c_{22}$. In particular, the pre-coding weights for the UE-1 102 may be set to $$\begin{cases} p_{11} = v a_{11}^* \\ p_{21} = v a_{12}^* \\ p_{12} = v a_{21}^* \\ p_{22} = v a_{22}^* \end{cases}, \quad (24)$$

where v is a power normalization factor and the elements $a_{ij}$ are elements of A. Substituting (24) into (23) yields $$\begin{bmatrix} c_{11} & c_{12} \\ c_{21} & c_{22} \end{bmatrix} = v \begin{bmatrix} |a_{11}|^2 + |a_{12}|^2 & a_{11}a_{21}^* + a_{12}a_{22}^* \\ a_{21}a_{11}^* + a_{22}a_{12}^* & |a_{21}|^2 + |a_{22}|^2 \end{bmatrix}. \quad (25)$$

It can thus be seen that $c_{11}$ and $c_{22}$ are enhanced constructively, while $c_{12}$ and $c_{21}$ are constructed randomly. Therefore, the condition of C becomes more robust. From a beam-forming point of view, layer-1 $s_1^{(1)}$ and layer-2 $s_2^{(1)}$ are beamed onto antenna-i 108 and antenna-2 110, respectively, following the MRC (Maximum Ratio Combining) criterion. The elements $c_{12}$ and $c_{21}$ represent both inter-layer interference and receiver diversity. Recall that $\lambda_1 + \lambda_2 = c_{11} + c_{22}$, where $\lambda_i$ (i=1,2) are eigenvalues of $$\begin{bmatrix} c_{11} & c_{12} \\ c_{21} & c_{22} \end{bmatrix}.$$

Since $c_{11}$ and $c_{22}$ are enhanced constructively, so are $\lambda_1 + \lambda_2$. In addition, according to Cauchy-Schwarz Inequality, we always have $$\left| \det\left( \begin{bmatrix} c_{11} & c_{12} \\ c_{21} & c_{22} \end{bmatrix} \right) \right| > 0$$

when $$\begin{cases} a_{11} \neq a_{21} \\ a_{12} \neq a_{22} \end{cases}.$$

For the UE-2 104, the elements of P may be selected in an analogous manner. The elements $p_{13}$, $p_{23}$, $p_{14}$, and $p_{24}$ are preferably selected to force $c_{31} = c_{32} = c_{41} = c_{42} = 0$, and $p_{33}$, $p_{43}$, $p_{34}$, and $p_{44}$ are preferably selected as $p_{33} = v a_{33}^*$, $p_{43} = v a_{34}^*$, $p_{34} = v a_{43}^*$, and $p_{44} = v a_{44}^*$, where v is as defined above. For UE-2 104, however, $$A = \begin{bmatrix} h_{33} & h_{34} \\ h_{43} & h_{44} \end{bmatrix} - \frac{1}{\Delta} \begin{bmatrix} h_{31} & h_{32} \\ h_{41} & h_{42} \end{bmatrix} \begin{bmatrix} h_{22} & -h_{12} \\ -h_{21} & h_{11} \end{bmatrix} \begin{bmatrix} h_{13} & h_{14} \\ h_{14} & h_{24} \end{bmatrix},$$

and $\Delta = h_{11}h_{22} - h_{12}h_{21}$.

A new scheme to further enhance multi-user MIMO system performance has been described. The above embodiments are based on splitting the interference cancellation task between a transmitter and receivers. Specifically, a transmitter performs inter-user separation pre-coding to define sub-MIMO channels, while receivers perform individual layer separation. The transmitter and each receiver benefit from this task partitioning. From the transmitter point of view, since it is no longer required to provide individual layer separation, it has the freedom to perform beamforming, which results in more robust equivalent channel matrix, and proportional power allocation. At the receiver, since multiple antennas are receiving signals from multiple layers, when the ML decoding algorithm is used, additional diversity gain can be achieved.

The above description relates primarily to MIMO systems in which sub-MIMO channels between the BTS 100 and each UE 102, 104 have the same dimension. However, it should be appreciated that these embodiments of the invention may also be extended to systems in which UEs do not have the same number of antennas, such that sub-MIMO channels of different dimensions are supported in the same system.

Figure 6:
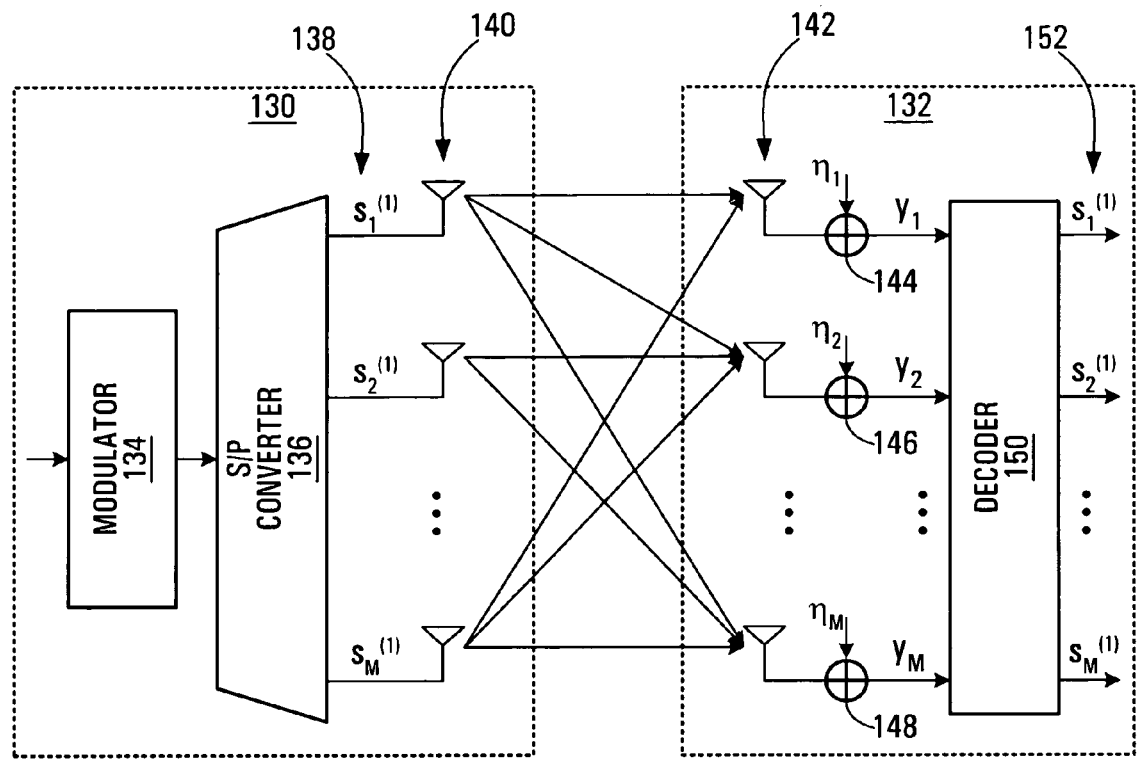
FIG. 6 is a block diagram of a MIMO BLAST system.

Further embodiments of the present invention will be best appreciated in conjunction with the following detailed analysis of MIMO, particularly MIMO BLAST. FIG. 6 is a block diagram of a MIMO BLAST system.

The system of FIG. 6 includes a BTS 130 and a UE 132. The BTS includes a modulator 134, an S/P (serial-to-parallel) converter 136, and a plurality of M antennas 140. At the UE

132, communication signals received at a plurality of N antennas 142 are decoded in a decoder 150 to recover the transmitted signals $s_1^{(1)}, \ldots, s_M^{(1)}$ at 152. Communication channel noise is represented by the adders 144, 146, 148.

FIG. 6 shows a general case of an M×N MIMO system. Although three representative signals and antennas are shown at the BTS 130 and the UE 132, the invention is in no way restricted any particular dimension of MIMO system. M and N may be equal to, larger than, or smaller than 3. Also, as described above in conjunction with FIG. 1, BTSs and UEs typically include further components that have not been shown in FIG. 6 to avoid congestion in the drawing.

According to the basic point-to-point Layered STC architecture known as BLAST, a sequence of the modulated symbols, each symbol having a duration of T, from the modulator 134, is serial-to-parallel converted in the S/P converter 136 into parallel transmission blocks in the signals 138. Each transmission block consists of $K_{ch}$ symbols, where $K_{ch}$ is the number of spatial channels. In the downlink transmission case, $K_{ch}$ is equal to the number of antennas, M, at the BTS 130. All of the symbols of a transmission block are simultaneously radiated into space, and each symbol is radiated by a respective one of the antennas 140. As the equivalent time duration of the transmission block relative to the original modulated signal output by the modulator 134 is $K_{ch}T$, the radiated signal requires spectrum width equal to a fraction $(1/K_{ch})$ of that of the original signal. This achieves a very high spectral efficiency.

The reception of a signal in such systems requires multiple antennas, with N≥M. The model of a received signal is described by following vector-matrix expression $$\bar{y} = \sqrt{P_s/M} H \bar{s} + \bar{\eta}, \quad (26)$$

where $P_s$ is the total transmitted power; and $\bar{y}$, M, H, $\bar{s}$, and $\bar{\eta}$ are as defined above.

The elements of H are preferably independent Gaussian complex random variables, with zero mean and $E\{|h_{mn}|^2\}=1$ variances. $\bar{\eta}$ also preferably has zero mean, and $R=2\sigma_\eta^2 I_N$ covariance matrix, where $I_N$ is an N×N-dimensioned unit matrix and $\sigma_\eta^2$ is the variance of one quadrature component of $\bar{\eta}$. The mean power of each radiated symbol is equal to unity, i.e., $E\{|s_m|^2\}=1$.

The solution for linear estimation of a vector of modulated symbols can be carried out, for example, by the ZF criterion expressed as $$\bar{\hat{s}} = H^+ \bar{y}/(P_s/M). \quad (27)$$

Estimation by the MMSE criterion is as follows:

$$\bar{\hat{s}} = (H'H/N + (2\sigma_\eta^2/P_s)I_M)^{-1}(H\sqrt{M})\bar{y} = (H' \sqrt{M})(HH'/N + (2\sigma_\eta^2/P_s)I_M)^{-1}\bar{y}, \quad (28)$$

where $I_M$ is an M×M-dimensioned unit matrix

The MMSE algorithm provides a significant gain as contrasted with the ZF algorithm in a channel with Rayleigh fading.

For single user point-to-point MIMO with an open-loop transmission, the MIMO channel capacity is proportional to min{N,M}. It well known that the throughput capacity of MIMO grows linearly with an increase of min{N,M}. Conventional MIMO-BLAST receiver processing schemes require co-processing of signals received by all antennas in the MIMO system. However, such a method cannot be applied for multi-user combined MIMO systems, as the signals received by all other UEs may not always be accessible to each UE. Therefore, usage of MIMO BLAST in multi-user systems to provide for multiple access may be inefficient, despite a marginal increase of throughput capacity at the expense of an increase in the number transmitting and receiving antennas.

In the multi-user point-to-multi-point case, since the inter-user communication is typically not done, the capacity of a multi-user system with open-loop transmit diversity is determined by $\min\{M, N_1, N_2, \ldots N_U\}$, where U, as above, is the number of UEs in a multi-user system. Thus, common throughput capacity will be limited by UEs with the least number of receiving antennas.

Figure 7:
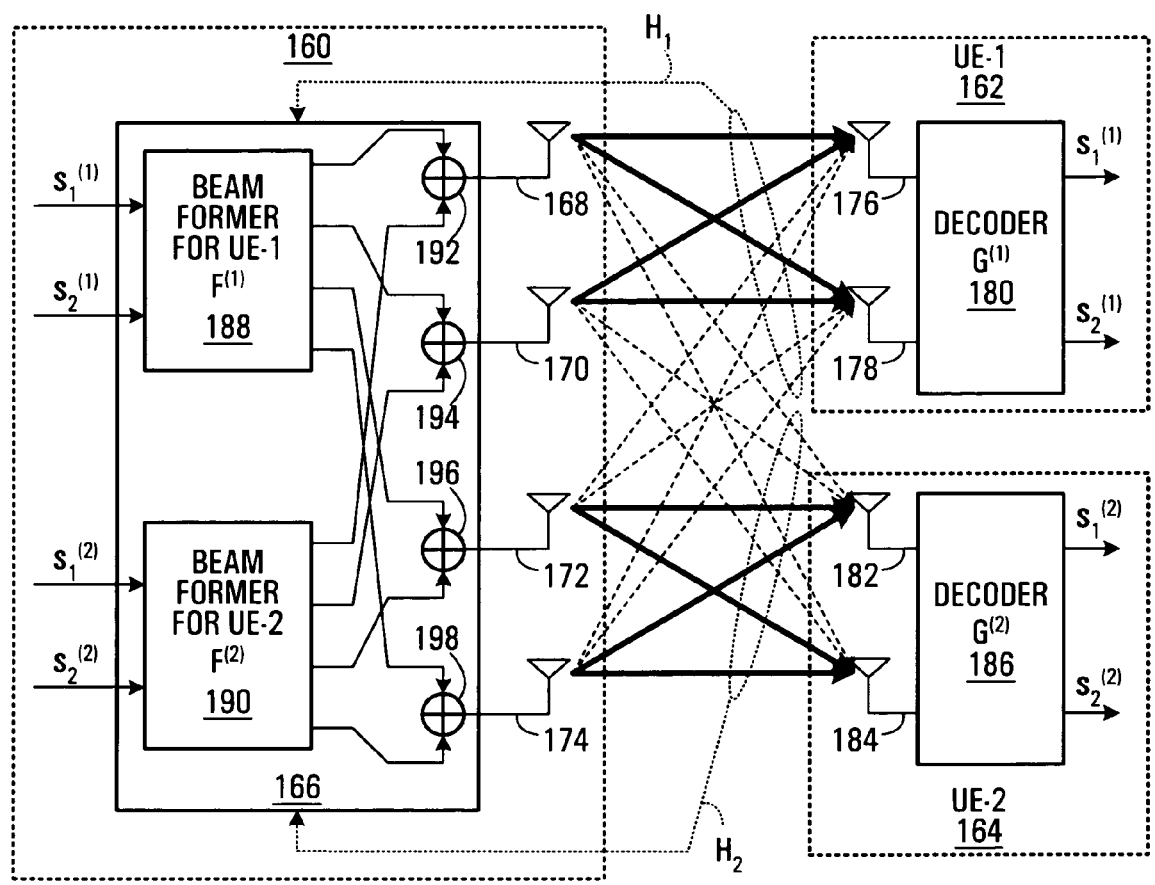
FIG. 7 is a block diagram of a multi-user MIMO system in accordance with another embodiment of the invention.

FIG. 7 is a block diagram of a multi-user MIMO system in accordance with another embodiment of the invention. The system of FIG. 7 includes a BTS 160 with a beamforming module 166 and a plurality of antennas 168, 170, 172, 174, and two UEs 162, 164, each having a pair of antennas 176/178, 182/184 and a decoder 180, 186. The beamforming module 166 includes respective beamformers 188, 190 and signal combiners 192/194, 196/198 for each UE 162, 164. The beamformers 188, 190, and possibly the signal combiners 192, 194, 196, 198, are preferably implemented using signal processing software in conjunction with either a DSP or a general-purpose processor at the BTS 160. The decoders 180, 186 are also preferably software-based.

Closed-Loop Transmit Diversity (CLTD), with different configurations for the two UEs 162, 164, is provided by feeding back channel state information shown as $H_1$, $H_2$ from the UEs 162, 164 to the BTS 160. It should be appreciated that the combined 4×2 (M=4, N=2, U=2) multi-user system of FIG. 7 is one illustrative example of a MIMO system to which the present invention may be applied, and that the invention is not limited thereto. This will become apparent from the following generalized analysis of multi-user MIMO with CLTD.

The BTS 160 has $K_{ch}$ spatial channels and M=4 antennas 168, 170, 172, 174, with $K_{ch} \leq M$. In a multi-user system, there exist only $K_{ch,i}$ channels to the $i^{th}$ UE. Signal vectors $\bar{s}(i)$ of symbols intended for the i th UE are multiplied in the beamformers 188, 190 by respective elements of $F = [F^{(1)}, F^{(2)}, \ldots F^{(U)}]$, which is a spatial coding matrix of spatial coding weights. Each element $F^{(i)}$ is a personal beamforming matrix for $i^{th}$ UE with M×$K_{ch,i}$ dimension and satisfying $$tr\{F^{(i)}F^{(i)T}\} = tr\{F^{(i)T}F^{(i)}\} = P_s, \ i=1, 2, \ldots, U \quad (29)$$

where $tr\{\bullet\}$ is the trace of a matrix.

As shown, signals output from each beamformer 188, 190 are combined in the signal combiners 192, 194, 196, 198 and output to respective antennas 168, 170, 172, 174.

In this case, a constant and equal transmitted power is applied to signals for all UEs. The vector signal received by the $i^{th}$ UE is described by $$\bar{y}^{(i)} = H^{(i)} F^{(i)} \bar{s}^{(i)} + H^{(i)} \sum_{n=1, n \neq i}^{U} F^{(n)} \bar{s}^{(n)} + \bar{\eta}^{(i)} = H^{(i)} F \bar{s} + \bar{\eta}^{(i)} \quad (30)$$

where $\bar{s}^{(i)} = [s_1^{(i)}, s_2^{(i)} \ldots s_{K_{ch,i}}^{(i)}]^T$ is a $K_{ch,i}$-dimensioned vector of symbols of the $i^{th}$ UE;

$\bar{s} = [s_1, s_2 \ldots s_M]^T$ is a $K_{ch}$-dimensioned vector of symbols of all UEs;

$$K_{ch} = \sum_{i=1}^{U} K_{ch,i}$$

is the total number of channels for the BTS;

$\bar{y}^{(i)} = [y_1^{(i)}, y_2^{(i)} \ldots y_N^{(i)}]^T$ is an N-dimensioned complex vector of signals received at the $i^{th}$ UE;

$H^{(i)}$ is an N×M-dimensioned matrix of complex channel gains from the BTS to the $i^{th}$ user;

$\eta^{(i)} = [\eta_1^{(i)}, \eta_2^{(i)} \ldots \eta_N^{(i)}]^T$ is an N-dimensioned complex vector of noise of observation for the $i^{th}$ user with zero mean and $R^{(i)} = 2\sigma_\eta^{(i)2} I_N$ covariance matrix.

In multi-user systems in which UEs have different numbers of antennas, N would be replaced with $N_i$ above, where $N_i$ is the number of antennas at the $i^{th}$ UE.

CLTD multi-user MIMO can be considered as the optimization of signal detection matrices. When the number of transmitting antennas is the same as the number of receiving antennas, so-called transmit and receive channel reciprocity exists. In this case, optimum weighting coefficients for beamforming for each UE are calculated at a BTS. The computed weighting coefficients are then used for radiation of a signal by the BTS. If the total number of receiving antennas of all UEs is equal to the number of transmitting antennas of the BTS, the full division of each transmitted signal, directly, on UE receiving antennas is satisfied.

Now consider a reverse channel problem for a single user, to determine a CLTD matrix for data transmission from an $i^{th}$ UE, with $N_i$ antennas on $K_{ch,i}$ parallel channels. The virtual reverse channel signal, observed at the BTS 166, is described by $$\bar{y}^{(i)} = \hat{H}^{(i)} \hat{F}^{(i)} \bar{s}^{(i)} + \vec{\hat{\eta}}^{(i)} \quad (31)$$

where $\hat{H}^{(i)} = [H^{(i)}]$ is an M×$N_i$-dimensional channel matrix of the virtual reverse MIMO channel;

$\hat{F}^{(i)}$ is the optimal virtual CLTD space time coding matrix of $N_i \times K_{ch,i}$ dimension; and the "^" symbol indicates matrices and vectors associated with the virtual reverse channel.

There are several ways to construct the $\hat{F}^{(i)}$ matrix. Consider first a singular decomposition of the channel matrix H, $\hat{H} = U\Lambda V^H$, where U and V are unitary matrices with M×M and $N_i \times N_i$ dimensions, respectively, and $\Lambda$ is a non-negative diagonal matrix with M×$N_i$ dimension. The squares of diagonal elements of $\Lambda$ are equal to eigenvalues of the $\hat{H}\hat{H}'$ matrix. The columns of U are eigenvectors of the $\hat{H}\hat{H}'$ matrix, and the columns of V are also eigenvectors of the $\hat{H}\hat{H}'$ matrix.

The optimum value of $\hat{F}$ can be shown to be $$\hat{F} = \bar{V}\Phi, \quad (32)$$

where $\bar{V}$ is a matrix with $N_i \times K_{ch,i}$ dimension, constructed from $K_{ch,i}$ columns of V, and $\Phi$ is a diagonal matrix with $K_{ch,i} \times K_{ch,i}$ dimension having non-negative diagonal elements satisfying the following condition:

$$tr(\hat{F}\hat{F}') = \sum_{k=1}^{K_{ch,i}} \phi_{k,k}^2 = P_s. \quad (33)$$

The diagonal elements of matrix $\Phi$ determine channel power allocation. A uniform power allocation gives $$\phi_{k,k}^2 = P_s / K_{ch,i}. \quad (34)$$

Some possible alternative versions of power allocation include:

1. MMSE criterion $$\phi_{k,k}^2 = 2\sigma_\eta^2 \left[ \frac{\mu}{\sqrt{\xi_{k,k}}} - \frac{1}{\xi_{k,k}} \right]^+; \quad (35)$$

2. Minimum Symbol-Error-Rate (MSER) criterion $$\phi_{k,k}^2 = \frac{2\sigma_\eta^2}{\xi_{k,k}} \left[ \log\left(\frac{\xi_{k,k}}{2\sigma_\eta^2}\right) - \mu \right]^+; \text{ and} \quad (36)$$

3. Maximum Capacity and Information Rate (MCIR) criterion, also commonly known as the water-filling algorithm $$\phi_{k,k}^2 = \left( \mu - \frac{2\sigma_\eta^2}{\xi_{k,k}} \right)^+, \quad (37)$$

where $$(\bullet)^+ = \max(\bullet, 0) = \frac{1}{2}(|\bullet| + \bullet);$$

$\xi_{k,k} = \lambda_{k,k}^2$ are eigenvalues of the $\hat{H}\hat{H}'$ matrix, and $\lambda_{k,k}$ are diagonal elements of the $\Lambda$ matrix; and $\mu$ is a factor that is selected to define each criteria.

After the CLTD matrix is constructed at the transmitter, equation (31) becomes $$\hat{y}^{(i)} = \hat{H}_F^{(i)} \bar{s}^{(i)} + \vec{\hat{\eta}}^{(i)} \quad i = 1, 2, \ldots U, \quad (38)$$

where $\hat{H}_F^{(i)} = (\hat{H}^{(i)} \hat{F}^{(i)}) / \sqrt{2\sigma_{\eta,i}^2}$ is a matrix of the virtual reverse MIMO channel with M×$K_{ch,i}$ dimension; and $\bar{\hat{\eta}} = \aleph(0, I_M)$ is an M-dimensioned complex vector of a virtual noise observed at a BTS, with zero mean and $\bar{R}_\eta = I_M$ covariance matrix.

A personal beamforming matrix $\hat{F}^{(i)}$ can thereby be constructed in a closed loop fashion for each individual user in the absence of other users. However, in a multi-user scenario, the presence of inter-user MIMO interference prevents such a straightforward user-specific personal beamforming approach. An embodiment of the invention provides a solution for the multi-user CLTD by using the MMSE criterion to minimize the inter-user MIMO interference, and a network solution for optimizing the multi-user MIMO allocation.

To integrate signals of all users into a virtual model, it is possible to re-write the virtual reverse MIMO channel model for multiple users, as given below:

$$\bar{y} = \hat{H}_F \bar{s} + \bar{\hat{\eta}}, \quad (39)$$

where $\bar{s} = [(\bar{s}^{(1)})^T, (\bar{s}^{(2)})^T, \ldots (\bar{s}^{(K_{ch})})^T]^T$ is a $\hat{K}_{ch}$-dimensioned vector of symbols, and $$\hat{K}_{ch} = \sum_{i=1}^{U} \hat{K}_{ch,i};$$

and $\hat{H}_F = [\hat{H}_F^{(1)}, \hat{H}_F^{(2)}, \ldots \hat{H}_F^{\hat{K}_{ch}}]$ is an $M \times \hat{K}_{ch}$-dimensioned matrix of the reverse virtual MIMO Channel.

It should be noted that $\hat{K}_{ch} \leq K_{ch} \leq M$, i.e. the number of estimated symbols is less than or equal to the number of received signals. In this situation, a very effective estimation can be carried out using, for example, a linear MMSE algorithm, as follows:

$$\hat{\bar{s}} = \hat{G}\hat{\bar{y}}, \quad (40)$$

where $$\hat{G} = \left(\hat{H}_F' \hat{H}_F + I_{\hat{K}_{ch,i}}\right)^{-1} \hat{H}_F' = \hat{H}_F' \left(\hat{H}_F \hat{H}_F' + I_{\hat{K}_{ch,i}}\right)^{-1}$$

or $$\hat{\bar{s}}^{(i)} = \hat{G}^{(i)}\hat{\bar{y}}, \quad (41)$$

where $$\hat{G}^{(i)} = \hat{H}_F^{(i)'} \left(\hat{H}_F \hat{H}_F' + I_{\hat{K}_{ch,i}}\right)^{-1}, i = 1, 2, \ldots U; \text{ and}$$

$$\hat{G} = \begin{bmatrix} \hat{G}^{(1)} \\ \hat{G}^{(2)} \\ \vdots \\ \hat{G}^{(U)} \end{bmatrix}.$$

Using a principle of identity (or duality) of receiving and transmitting channels, an optimum demodulation matrix $\hat{G}$ is preferably used for generating $F = [F^{(1)}, F^{(2)}, \ldots F^{(U)}]$, the CLTD or beamforming matrix, at a BTS. In this case, personal beamforming matrices are preferably determined by $$F^{(i)} = \sqrt{P_s} \frac{\hat{G}^{(i)'}}{\sqrt{\text{tr}(\hat{G}^{(i)'} \hat{G}^{(i)})}} = \sqrt{P_s} \frac{\hat{G}^{(i)'}}{\sqrt{\sum_{m=1}^{K_{ch,i}} \sum_{n=1}^{U} |\hat{g}_{m,n}^{(i)}|^2}}, \quad (42)$$

where $\hat{g}_{m,n}$ is $(m,n)^{th}$ element of $\hat{G}^{(i)}$.

The model of an observed (received) signal at the input of the UE of the $i^{th}$ user can be written as $$\bar{y}^{(i)} = H^{(i)} F^{(i)} \bar{s}^{(i)} + H^{(i)} \sum_{n=1, n \neq i}^{U} F^{(n)} \bar{s}^{(n)} + \bar{\eta}^{(i)} \quad (43)$$

$$= H_F^{(i,i)} \bar{s}^{(i)} + H^{(i)} \sum_{n=1, n \neq i}^{U} H_F^{(i,n)} \bar{s}^{(i)} + \bar{\eta}^{(i)},$$

$$= H_F^{(i)} \bar{s} + \bar{\eta}^{(i)}$$

where $H_F^{(i,n)} = H^{(i)} F^{(n)}$, $H_F^{(i)} = [H_F^{(i,1)}, \ldots H_F^{(i,U)}]$. In some communication systems, the BTS can measure the $H_F^{(i,n)}$ $n = 1, 2 \ldots U$ matrices. In other systems, the UEs feed back channel matrices to the BTS.

The BTS can compute the personalized demodulation matrix for the $i^{th}$ user as $$\hat{G}^{(i)} = H_F^{(i,i)'} \left[\sum_{n=1}^{U} \hat{H}_F^{(i,n)} \hat{H}_F^{(i,n)'} + 2\sigma_\eta^2 I_{N_i}\right]^{-1} \quad (44)$$

$$= H_F^{(i,i)'} \left[\hat{H}_F^{(i)} \hat{H}_F^{(i)'} + 2\sigma_\eta^2 I_{N_i}\right]^{-1},$$

and sends to each UE its respective demodulation matrix $\hat{G}^{(i)}$.

Integrating all transformations for calculating the CLTD matrix (personal beamforming matrices $F^{(i)}$ at a BTS side and personal beamforming matrices $\hat{G}^{(i)}$ at UE side), yields the following algorithm to achieve CLTD based multi-user MIMO transmission in accordance with an embodiment of the invention:

At a BTS Side:

$$F^{(i)} = \sqrt{P_s} \frac{\hat{G}^{(i)'}}{\sqrt{\text{tr}(\hat{G}^{(i)'} \hat{G}^{(i)})}} \quad (45)$$

$$\hat{G}^{(i)} = \hat{H}_F^{(i)'} \left[\hat{H}_F \hat{H}_F' + I_{N_i}\right]^{-1}$$

$$\hat{H}_F = [\hat{H}_F^{(1)}, \ldots \hat{H}_F^{(U)}]$$

$$\hat{H}_F^{(i)} = \left(\hat{H}^{(i)} \hat{F}^{(i)}\right) / \sqrt{2\sigma_{\eta,i}^2}$$

$$\hat{H}^{(i)} = [H^{(i)}]'$$

$$\hat{F}^{(i)} = \bar{V}^{(i)} \Phi^{(i)}$$

At a UE Side:

$$\hat{G}^{(i)} = H_F^{(i,i)'} \left[\sum_{n=1}^{U} \hat{H}_F^{(i,n)} \hat{H}_F^{(i,n)'} + 2\sigma_\eta^2 I_{N_i}\right]^{-1} \quad (46)$$

$$H_F^{(i,n)} = H^{(i)} F^{(n)}$$

In the above multi-user system, the following constraints are preferably satisfied:

$$\sum_{i=1}^{U} K_{ch,i} \leq M \quad (47)$$
$$K_{ch,i} \leq N_i.$$

The first constraint of (47) specifies that the total number of parallel channels should not exceed the number of BTS antennas, which actually determines the number of parallel spatial channels. The second constraint specifies that the number of receiving antennas at a UE should be greater than or equal to the number of parallel spatial channels assigned to it. These conditions allow the use of linear methods to construct the personal beamforming matrices at both the BTS and UE for all users.

For TDD (Time Division Duplexing) communications, all the computing can be done at a BTS. The BTS determines all relevant parameters, calculates both the BTS and UE beamforming matrices, and feeds back a personal beamforming receive matrix $\hat{G}^{(i)}$ to each UE.

For the FDD (Frequency Division Duplexing) case, all the UEs can determine and feed back the initial SVD (Singular Value Decomposition) beamforming matrix $\hat{F}^{(i)}$ to the BTS, which then jointly integrates all $\hat{F}^{(i)}$ matrices to compute the dedicated beamforming transmit matrix $F^{(i)}$ for each UE. The BTS then computes and sends a respective beamforming receive matrix $G^{(i)}$ to each mobile terminal.

Embodiments of the above CLTD-based multi-user MIMO exhibit performance advantages relative to conventional open-loop solutions. For the purposes of comparison, the following simulation conditions were used: (1) R=½ turbo coding, block length 1280 bits, (2) QPSK (Quadrature Phase Shift Keying) modulation, (3) MMSE receiver for all schemes, and (4) ideal channel feedback.

Before proceeding with a discussion of simulation results, each of the conventional technologies with which comparison is made will be briefly described.

Figure 8:
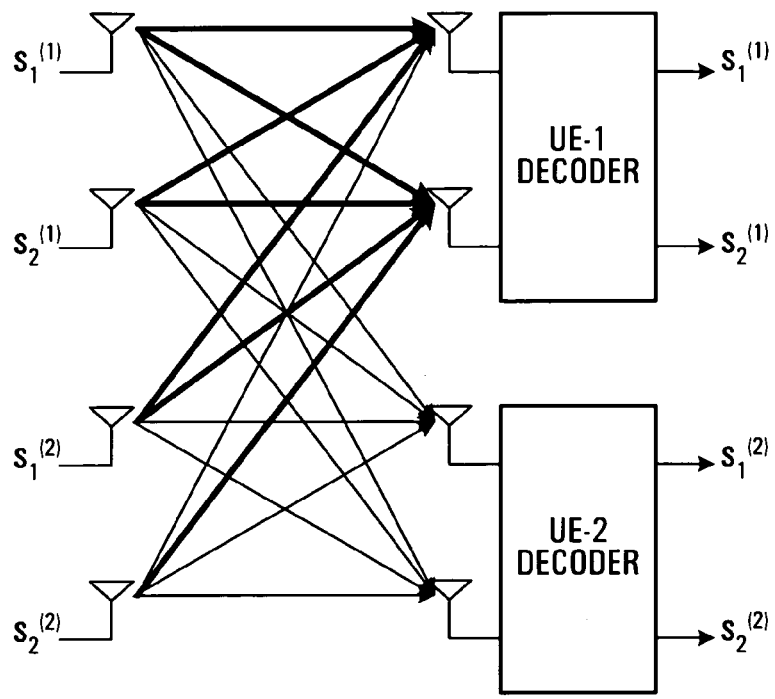
FIG. 8 is a block diagram of a conventional null beamforming MIMO system.

Null beamforming is an open-loop scheme where the number of transmitting antennas is equal to the total number of receiving antennas, namely $$\sum_{i=1}^{U} K_{ch,i} = M,$$

and $K_{ch,i}=N_i$, such as shown in FIG. 8. Therefore, it is possible to perform null beamforming to reduce the inter-user interference of the BTS antenna emissions to the other users. The configuration of 2×8×2 for a 4 user environment was considered in the simulations presented below.

Figure 9:
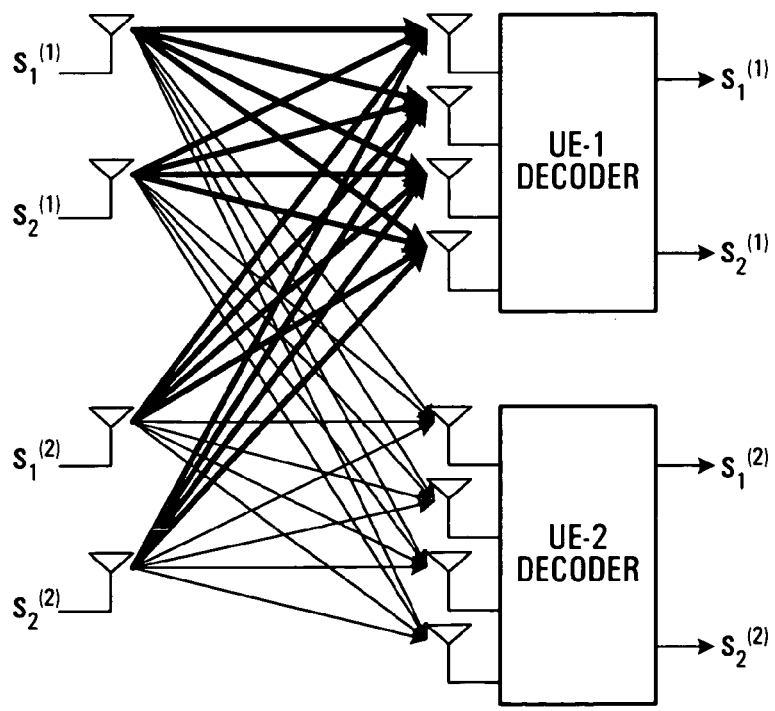
FIG. 9 is a block diagram of a known multi-user BLAST MIMO system.

In one known open-loop multi-user BLAST technique, the number of transmitting antennas is the same as the number of receiving antennas for each UE, as shown in FIG. 9, and the number of channels is equal to the number of transmitting antennas. A UE receive signal can be expressed as $$\overline{y}^{(i)} = \sqrt{\frac{P_s}{K_{ch,i}}} H^{(i)}\overline{s} + \overline{\eta}^{(i)},$$

where $\overline{s}$ is an M-dimensioned vector of symbols. At $N_i \geq M$, it is possible to use an MMSE algorithm for demodulation of the entire $\overline{s}$ vector. Therefore, from the demodulated $\overline{s}$ vector, the symbols transmitted to a particular user are extracted. This scheme is generally known as Multi-user BLAST. We evaluate the configuration for such a system with dimension 2×8×8 and U=4.

Figure 10:
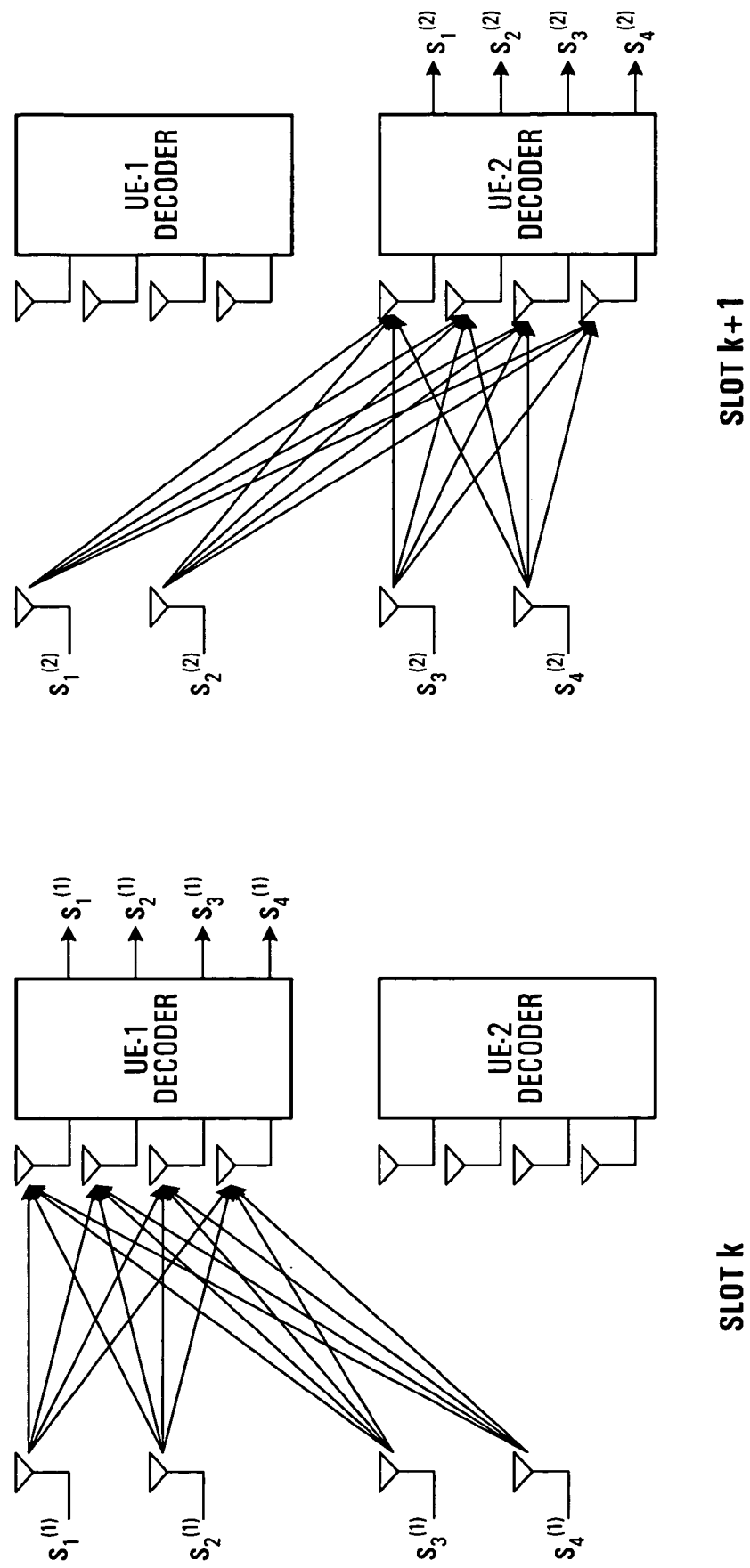
FIG. 10 is a block diagram of a known round-robin TDM (Time Division Multiplexing) BLAST MIMO system.

Let $K_{ch,i}=M/U$ and $N_i \geq M$. In this case, it is possible for a BTS to group together the signals of each user into units with M symbols to thereby obtain units to sequentially transmit in a round robin fashion. At a UE side, the $i^{th}$ time slot is demodulated by the $i^{th}$ user with an MMSE decoder. This type of system in shown in FIG. 10. The performance of such a system is the same as a point-to-point BLAST system, with the compression of the duration of radiation of a signal of each user by a factor of 1/U in time without increasing the transmit power. We evaluate the configuration 2×8×8 and U=4 for such a system.

Figure 11:
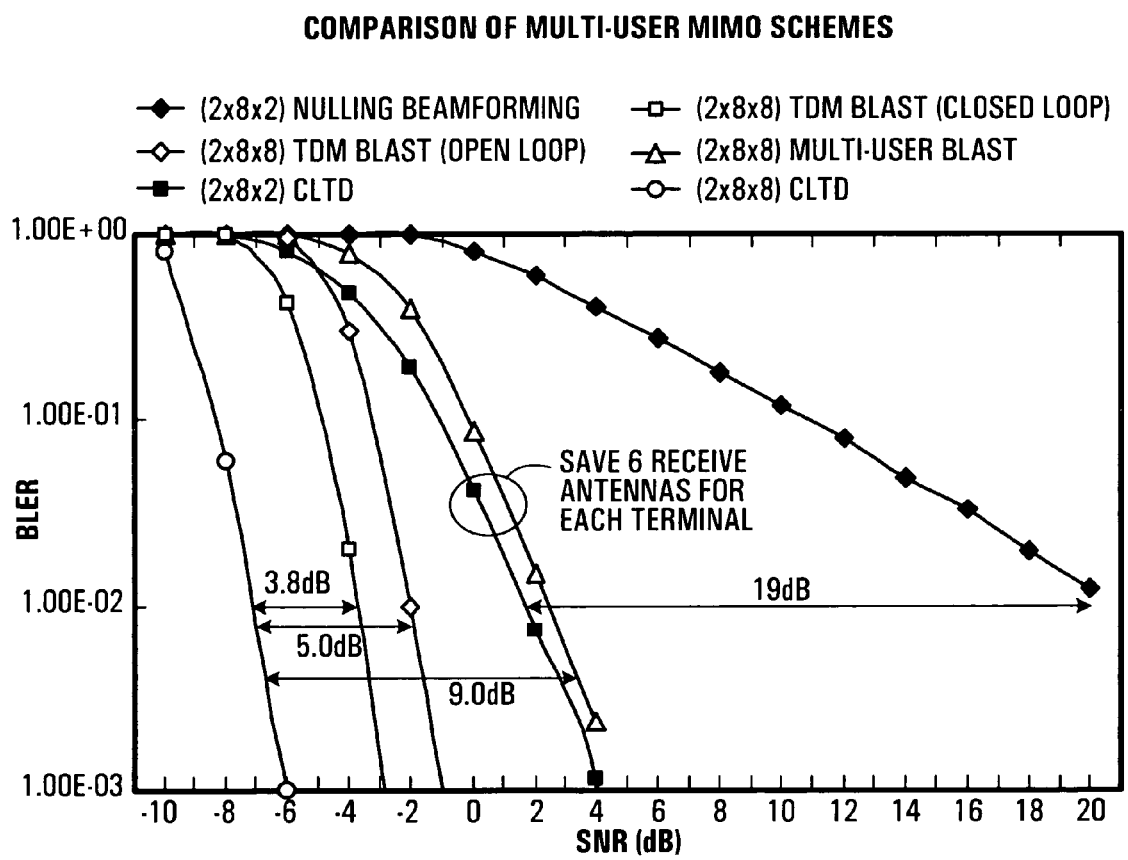
FIG. 11 is a plot of BLER (Block Error Rate) versus SNR (Signal-to-Noise Ratio) for an embodiment of the invention and several known communication schemes.
Figure 12:
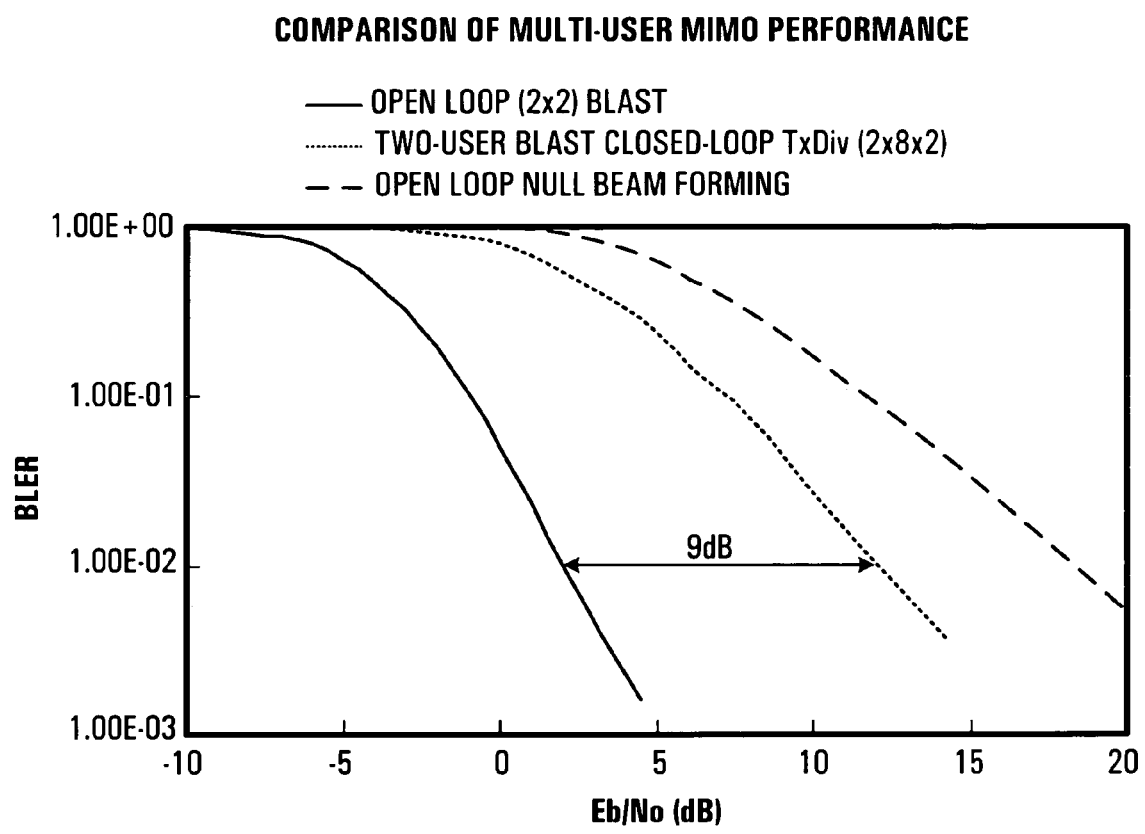
FIG. 12 is a plot of BLER versus Eb/No (Energy per Bit to Spectral Noise Density ratio) for an embodiment of the invention and several known communication schemes.
Figure 13:
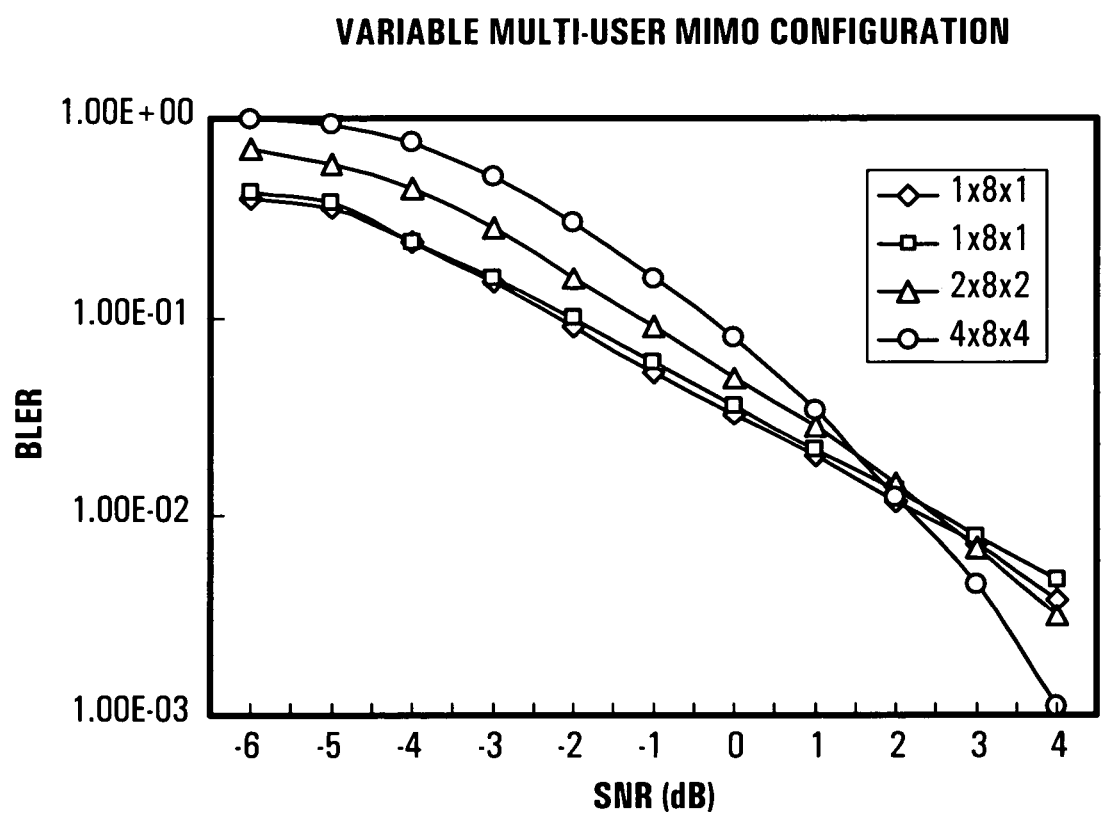
FIG. 13 is a plot of BLER versus SNR for several embodiments of the invention.

FIGS. 11-13 show simulation results for embodiments of the invention and the above known technologies.

FIG. 11 shows a plot of BLER versus SNR for an embodiment of the invention and several known communication schemes. It can be seen from FIG. 11 that for 8 transmit antennas at a BTS and 4 concurrent users each with 2 receive antennas at each UE, a CLTD scheme according to an embodiment of the invention has 19 dB gain over open-loop null beamforming. This simulated CLTD scheme also achieves virtually the same performance as the 4 users open-loop multi-user BLAST each with 8 receive antennas. In this case, a reduction of 6 receive antennas at each UE can be realized. Given 8 receive antennas at the UE side, the proposed CLTD scheme achieves 5 dB gain over the conventional open-loop TDM BLAST, 9 dB gain over multi-user BLAST, and 3.8 dB gain over the closed-loop TDM BLAST.

FIG. 12 is a plot of BLER versus Eb/No for an embodiment of the invention and several known communication schemes. The simulated CLTD scheme from which the plot of FIG. 12 was generated is clearly superior to point-to-point MIMO (open-loop BLAST) and null beamforming.

FIG. 13 is a plot of BLER versus SNR for several embodiments of the invention, and demonstrates the scalability of multi-user MIMO and MISO (Multiple Input Single Output) configurations according to embodiments of the invention. For the different configurations indicated in FIG. 13, all users achieve substantially the same level of QoS (Quality of Service).

Numerous modifications and variations of the present invention are possible in light of the above teachings. It is therefore to be understood that within the scope of the appended claims, the invention may be practised otherwise than as specifically described herein.

Of course it is to be understood that in a given application, specific parameters may change. For example, different numbers of users, transmit antennas, and receive antennas may change the particular derivation details and equations above. However, adaptation of the above and further embodiments of the invention to other types and dimensions of systems than those explicitly described will be apparent to those skilled in the art from the foregoing.

It should also be appreciated that references to transmitting or sending signals is not intended to limit the invention only to embodiments in which signals are transmitted exactly as generated, without any further processing. For example, signals may be compressed or otherwise processed prior to transmission, or stored for subsequent transmission at a later time.

We claim:

1. A method of processing signals to be transmitted to receivers on a plurality of communication channels, comprising:

determining pre-coding signal weights based on channel state information associated with the plurality of communication channels to provide proportional power allocation to the signals; and applying the pre-coding signal weights to the signals, wherein the pre-coding signal weights are elements of a pre-coding matrix P, wherein determining further comprises determining the pre-coding signal weights to enhance diagonal elements of a combined communication channel matrix C=HP, where H is a matrix of the channel state information; and wherein $$P = \begin{bmatrix} p_{11} & p_{12} \\ p_{21} & p_{22} \end{bmatrix},$$

wherein $$H = \begin{bmatrix} h_{11} & h_{12} \\ h_{21} & h_{22} \end{bmatrix},$$

and wherein determining comprises selecting the pre-coding signal weights of P such that $$|p_{11}| \propto \left|h_{11} - \frac{h_{12}h_{21}}{h_{22}}\right|;$$

$$|p_{22}| \propto \left|h_{22} - \frac{h_{12}h_{21}}{h_{11}}\right|;$$

$$p_{12} = -\frac{h_{12}p_{22}}{h_{11}}; \text{ and}$$

$$p_{21} = -\frac{h_{21}p_{11}}{h_{22}}.$$

2. A method of processing signals transmitted to receivers on a plurality of communication channels, comprising:
at a transmitter:
determining pre-coding signal weights based on channel state information associated with the plurality of communication channels to provide proportional power allocation to the signals;
applying the pre-coding signal weights to the signals; and
transmitting weighted signals to the receivers on the plurality of communication channels;
wherein the transmitter comprises four antennas comprising two sub-groups of antennas comprising two antennas each, each sub-group of two antennas respectively associated with two sub-groups of communication channels of the plurality of communication channels, each sub-group of communication channels comprising two communication channels; and
at each of the receivers:
receiving a subset of the weighted signals over one of the sub-groups of communication channels; and
decoding the subset of the weighted signals using inverses of the pre-coding signal weights based on the channel state information associated with the one of the sub-groups of communication channels;
wherein the pre-coding signal weights are elements of a pre-coding matrix P, and wherein determining further comprises determining the pre-coding signal weights to enhance diagonal elements of a combined communication channel matrix C=HP, where H is a matrix of the channel state information; and
wherein determining the pre-coding signal weights comprises selecting the pre-coding signal weights of P such that $$C = HP = \begin{bmatrix} c_{11} & c_{12} & 0 & 0 \\ c_{21} & c_{22} & 0 & 0 \\ 0 & 0 & c_{33} & c_{34} \\ 0 & 0 & c_{43} & c_{44} \end{bmatrix},$$

where a group of the first two rows of C is associated with a first of the two sub-groups of communication channels, a group of the third and fourth rows of C is associated with a second of the two sub-groups of communication channels, a group of the first two columns of C is associated with a first of the two sub-groups of two antennas, and a group of the third and fourth columns of C is associated with a second of the two sub-groups of two antennas.

3. A method of processing signals to be transmitted to receivers on a plurality of communication channels, comprising:
determining pre-coding signal weights based on channel state information associated with the plurality of communication channels to provide proportional power allocation to the signals; and
applying the pre-coding signal weights to the signals,
wherein the signals comprise respective groups of signals to be transmitted to the receivers, wherein determining the pre-coding signal weights further comprises determining the pre-coding signal weights to separate the respective groups of signals,
wherein the method is implemented at a transmitter in a multi-user MIMO (Multiple Input Multiple Output) communication system that provides respective N ×N sub-MIMO channels from the transmitter to the receivers, wherein each of the groups of signals comprises N signals, and
wherein determining the pre-coding signal weights further comprises determining elements of a pre-coding matrix P such that a combined communication channel matrix C =HP has a form of U N ×N sub-matrices, diagonal elements of which are respective diagonal elements of C, and elements of C outside the N ×N sub-matrices are forced to zero.

4. The method of claim 3, wherein the transmitter has M=4 antennas, wherein U=2, N=2, $$P = \begin{bmatrix} p_{11} & p_{12} & p_{13} & p_{14} \\ p_{21} & p_{22} & p_{23} & p_{24} \\ p_{31} & p_{32} & p_{33} & p_{34} \\ p_{41} & p_{42} & p_{43} & p_{44} \end{bmatrix}, H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix},$$

$$C = HP = \begin{bmatrix} c_{11} & c_{12} & 0 & 0 \\ c_{21} & c_{22} & 0 & 0 \\ 0 & 0 & c_{33} & c_{34} \\ 0 & 0 & c_{43} & c_{44} \end{bmatrix},$$

wherein determining elements of P comprises:
selecting $p_{31}, p_{41}, p_{32},$ and $p_{42}$ to force $c_{13}=c_{14}=c_{23}=c_{24}=0$;
selecting $$\begin{cases} p_{11} = va_{11}^* \\ p_{21} = va_{12}^* \\ p_{12} = va_{21}^* \\ p_{22} = va_{22}^* \end{cases},$$

where v is a power normalization factor and $a_{ij}$ are elements of A, where $$A = \begin{bmatrix} h_{11} & h_{12} \\ h_{21} & h_{22} \end{bmatrix} - \frac{1}{\Delta} \begin{bmatrix} h_{13} & h_{14} \\ h_{23} & h_{24} \end{bmatrix} \begin{bmatrix} h_{44} & -h_{34} \\ -h_{43} & h_{33} \end{bmatrix} \begin{bmatrix} h_{31} & h_{32} \\ h_{41} & h_{42} \end{bmatrix}$$

and $\Delta=h_{33}h_{44}-h_{34}h_{43}$;
selecting $p_{13}, p_{23}, p_{14},$ and $p_{24}$ to force $c_{31}=c_{32}=c_{41}=c_{42}=0$; and
selecting $$\begin{cases} p_{33} = va_{11}^* \\ p_{43} = va_{12}^* \\ p_{34} = va_{21}^* \\ p_{44} = va_{22}^* \end{cases},$$

where $a_{ij}$ are elements of A, where $$A = \begin{bmatrix} h_{33} & h_{34} \\ h_{43} & h_{44} \end{bmatrix} - \frac{1}{\Delta} \begin{bmatrix} h_{31} & h_{32} \\ h_{41} & h_{42} \end{bmatrix} \begin{bmatrix} h_{22} & -h_{12} \\ -h_{21} & h_{11} \end{bmatrix} \begin{bmatrix} h_{13} & h_{14} \\ h_{14} & h_{24} \end{bmatrix},$$

and $\Delta = h_{11}h_{22} - h_{12}h_{21}$.

5. A method, implemented in a MIMO (Multiple Input Multiple Output) communication system, of processing signals to be concurrently transmitted to receivers over a plurality of communication channels comprising:
  determining channel state information for the plurality of communication channels;
  determining a spatial coding matrix comprising a respective set of spatial coding weights for each of the receivers based on the channel state information;
  applying the respective sets of spatial coding weights in the spatial coding matrix to the signals, wherein the signals comprise a plurality of groups of at least one signal to be transmitted to respective ones of the receivers; and
  transmitting the signals to the receivers, wherein the spatial coding matrix F comprises elements $[F^{(1)}, F^{(2)}, \ldots F^{(U)}]$, U is an integer, and each element $F^{(i)}$ is the respective set of spatial coding weights for an $i^{th}$ one of the receivers and satisfies $tr\{F^{(i)}F^{(i)'}\} = tr\{F^{(i)'}F^{(i)}\} = P_s$, $i = 1, 2, \ldots, U$, where $tr\{\bullet\}$ is a trace of a matrix, and $P_s$ is a total transmitted power of the signals;
  wherein determining the spatial coding matrix comprises determining the elements $F^{(i)}$ of F as $$F^{(i)} = \sqrt{P_s} \frac{\hat{G}^{(i)'}}{\sqrt{tr(\hat{G}^{(i)'}\hat{G}^{(i)})}},$$

where
$\hat{G}^{(i)} = \hat{H}_F^{(i)'}(\hat{H}_F\hat{H}'_F + I_{N_i})^{-1}$, $i = 1, 2, \ldots U$, is a set of demodulation weights corresponding to $F^{(i)}$;
$\hat{H}_F = [\hat{H}_F^{(1)}, \ldots \hat{H}_F^{(U)}]$;
$\hat{H}_F^{(i)} = (\hat{H}^{(i)}F^{(i)})/\sqrt{2\sigma_{n_i}^2}$ is a combined channel matrix of a virtual reverse MIMO channel from the ith receiver;
  $\hat{H}^{(i)} = [H^{(i)}]'$ is a matrix of the channel state information of the virtual Reverse MIMO channel from the ith receiver;
  $H^{(i)}$ is a matrix of the channel state information for forward MIMO channel of a plurality of channels to the ith receiver;
  $\sqrt{F^{(i)}}$ is a spatial coding matrix of the virtual reverse MIMO channel from the ith receiver;
  $I_{N_i}$ is a unit matrix;
  $N_i$ is a number of signals in the plurality of groups of at least one signal to be transmitted to the ith receiver; and
  $\sigma_{n_i}^2$ is a variance of a component of noise at the ith receiver.

6. The method of claim 5, further comprising:
  transmitting a respective set of demodulation weights $\hat{G}^{(i)}$ to each of the receivers.

7. The method of claim 5, wherein $\hat{F}^{(i)} = \overline{V}^{(i)}\Phi^{(i)}$ where
  $\overline{V}^{(i)}$ is a matrix constructed from columns of $V^{(i)}$;
  $V^{(i)}$ is a unitary matrix resulting from a singular decomposition of the channel matrix $H^{(i)}$ of the forward MIMO channel to the ith receiver as $\hat{H}^{(i)} = U^{(i)}\Lambda^{(i)}V^{(i)H}$, where $U^{(i)}$ and $V^{(i)}$ are unitary matrices, $\Lambda^{(i)}$ is a non-negative diagonal matrix, squares of diagonal elements of $\Lambda^{(i)}$ are equal to eigenvalues of an $\hat{H}^{(i)}\hat{H}^{(i)'}$ matrix, columns of $U^{(i)}$ are eigenvectors of the $\hat{H}^{(i)}\hat{H}^{(i)'}$ matrix, and columns of $V^{(i)}$ are also eigenvectors of the $\hat{H}^{(i)}\hat{H}^{(i)'}$ matrix; and
  $\Phi^{(i)}$ is a diagonal matrix having non-negative diagonal elements that determine channel power allocation and satisfy $$tr(\hat{F}^{(i)}\hat{F}^{(i)'}) = \sum_{k=1}^{K_{ch,i}} \phi_{k,k}^{(i)\,2} = P_s,$$

where $K_{ch,i}$ is a number of spatial channels to the ith receiver.

8. The method of claim 7, wherein the diagonal elements of $\Phi^{(i)}$ are selected according to a criterion selected from a group consisting of:
  a uniform power criterion, $\phi^{(i)}k,k^2 = P_s/K_{ch,i}$;
  an MMSE (Maximum Mean Squared Error) criterion, $$\phi_{k,k}^{(i)\,2} = 2\sigma_{\eta,i}^2 \left[ \frac{\mu}{\sqrt{\xi_{k,k}^{(i)}}} - \frac{1}{\xi_{k,k}^{(i)}} \right]^+;$$

an MSER (Minimum Symbol-Error-Rate) criterion, $$\phi_{k,k}^{(i)\,2} = \frac{2\sigma_{\eta,i}^2}{\xi_{k,k}^{(i)}} \left[ \log\left(\frac{\xi_{k,k}^{(i)}}{2\sigma_{\eta,i}^2}\right) - \mu \right]^+;$$

and
  an MCIR (Maximum Capacity and Information Rate) criterion, $$\phi_{k,k}^{(i)2} = \left(\mu - \frac{2\sigma_{\eta,i}^2}{\xi_{k,k}^{(i)}}\right)^+,$$

where $$(\bullet)^+ = \max(\bullet, 0) = \frac{1}{2}(|\bullet| + \bullet);$$

$\xi^{(i)}_{k,k} = \Lambda^{(i)\,2}_{k,k}$ are eigenvalues of the $\hat{H}^{(i)}\hat{H}^{(i)'}$ matrix, and $\Lambda^{(i)}_{k,k}$ are diagonal elements of the $\Lambda^{(i)}$ matrix; and
$\mu$ is a factor selected to define the MMSE, MSER, and MCIR criteria.

* * * * *

UNITED STATES PATENT AND TRADEMARK OFFICE
CERTIFICATE OF CORRECTION

PATENT NO. : 8,705,659 B2
APPLICATION NO. : 10/792127
DATED : April 22, 2014
INVENTOR(S) : Wen Tong et al.

It is certified that error appears in the above-identified patent and that said Letters Patent is hereby corrected as shown below:

In the Claims

Col. 23, line 26: Change "$tr\{F^{(i)}\, F^{(i)'}\} = tr\{F^{(i)'}\, F^{(i)}\} = P_s, i = 1, 2, \ldots, U,$" to "$tr\{F^{(i)}\, F^{(i)'}\} = tr\{F^{(i)'}\, F^{(i)}\} = P_s, i = 1, 2, \ldots, U,$"

Col. 23, line 45: Change "$\tilde{H}^{(i)} = [H(i)]'$," to "$\hat{H}^{(i)} = [H^{(i)}]'$,"

Col. 23, line 46: Change "Reverse" to "reverse"

Col. 23, line 49: Change "forward MIMO channel" to "a forward MIMO channel"

Col. 23, line 51: Change "$\sqrt{F^{(i)}}$" to "$\hat{F}^{(i)}$"

Col. 24, line 4: Change "of the channel matrix" to "of the matrix"

Col. 24, line 55: Change "$\xi^{(i)}_{k,k} = \Lambda^{(i)}_{k,k}{}^{2}$" to "$\xi^{(i)}_{k,k} = \lambda^{(i)}_{k,k}{}^{2}$"

Col. 24, line 56: Change "$\Lambda^{(i)}_{k,k}$" to "$\lambda^{(i)}_{k,k}$"

Signed and Sealed this
Seventeenth Day of June, 2014

Michelle K. Lee
*Deputy Director of the United States Patent and Trademark Office*